(12) United States Patent
Huang et al.

(10) Patent No.: US 12,382,102 B2
(45) Date of Patent: Aug. 5, 2025

(54) COEFFICIENT ENCODING METHOD, COEFFICIENT DECODING METHOD, ENCODING DEVICE, DECODING DEVICE, AND STORAGE MEDIUM

(71) Applicant: GUANGDONG OPPO MOBILE TELECOMMUNICATIONS CORP., LTD., Dongguan (CN)

(72) Inventors: Hang Huang, Dongguan (CN); Qichao Yuan, Dongguan (CN); Fan Wang, Dongguan (CN); Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 147 days.

(21) Appl. No.: 18/367,101

(22) Filed: Sep. 12, 2023

(65) Prior Publication Data
US 2023/0421816 A1 Dec. 28, 2023

Related U.S. Application Data

(63) Continuation of application No. PCT/CN2021/080635, filed on Mar. 12, 2021.

(51) Int. Cl.
*H04N 19/70* (2014.01)
*H04N 19/176* (2014.01)
*H04N 19/46* (2014.01)

(52) U.S. Cl.
CPC .......... *H04N 19/70* (2014.11); *H04N 19/176* (2014.11); *H04N 19/46* (2014.11)

(58) Field of Classification Search
CPC ....... H04N 19/70; H04N 19/176; H04N 19/46
See application file for complete search history.

(56) References Cited

U.S. PATENT DOCUMENTS 8,976,861 B2 3/2015 Rojals
11,516,493 B2 * 11/2022 Bossen .................. H04N 19/13
(Continued)

FOREIGN PATENT DOCUMENTS

CN 100345449 C 10/2007
CN 104185990 B 6/2018
(Continued)

OTHER PUBLICATIONS

International Search Report in the international application No. PCT/CN2021/080635, mailed on Dec. 17, 2021, 6 pages with English translation.
(Continued)

*Primary Examiner* — Zhubing Ren
(74) *Attorney, Agent, or Firm* — BAYES PLLC

(57) ABSTRACT

A coefficient encoding method, a coefficient decoding method, corresponding devices, and a storage medium are provided. In the coefficient decoding method, the value of said coefficient is determined according to the syntax elements obtained by decoding, wherein the syntax elements include: a non-zero flag, an M absolute values greater than Xi flag, a modulo result flag, a residual value flag, and a sign flag; the absolute value of said coefficient is the sum of the sum of corresponding numerical values preset for the coded value of the non-zero flag, the coded value of the M absolute values greater than Xi flag, and the coded value of the modulo result flag, and the product of the encoded value of the residual value flag and N; the value of said coefficient is a value determined according to the absolute value of said coefficient and a sign flag indicating positive or negative.

20 Claims, 15 Drawing Sheets

(56) References Cited

U.S. PATENT DOCUMENTS

| | | | |
|---|---|---|---|
| 2009/0232199 A1* | 9/2009 | Kobayashi | H04N 19/46 375/E7.026 |
| 2014/0307800 A1 | 10/2014 | Sole Rojals et al. | |
| 2017/0142448 A1 | 5/2017 | Karczewicz | |
| 2020/0288134 A1 | 9/2020 | Lim | |
| 2020/0396445 A1* | 12/2020 | Seregin | H04N 19/159 |
| 2024/0323443 A1* | 9/2024 | Sarwer | H04N 19/645 |

FOREIGN PATENT DOCUMENTS

| | | |
|---|---|---|
| CN | 108353167 A | 7/2018 |
| CN | 109788285 A | 5/2019 |
| CN | 110708552 A | 1/2020 |
| CN | 111586419 A | 8/2020 |
| WO | 2019027241 A1 | 2/2019 |

OTHER PUBLICATIONS

Written Opinion of the International Search Authority in the international application No. PCT/CN2021/080635, mailed on Dec. 17, 2021, 6 pages with English translation.

Joel Sole et al: "Transform Coefficient Coding in HEVC", IEEE Transactions on Circuits and Systesms for Video Technology, IEEE, USA, vol. 22, No. 12, Dec. 1, 2012 (Dec. 1, 2012), pp. 1765-1777, XP011486338, ISSN: 1051-8215, DOI: 10.1109/TCSVT.2012. 2223055, the whole document.

Bross B et al: "Versatile Video Coding(Draft 10)", 19. JVET Meeting; Jun. 22-Jul. 1, 2022; Teleconference; (The Joint Video Exploration Team of ISO/IEC JTC/SC29/WG11 and ITU-T SG. 16 ), No. JVET-S2001, Sep. 4, 2020 (Sep. 4, 2020), XP030289618, [7.3.11.11 Residual coding syntax]; p. 84; [7.4.12.11 Residual coding semantics]; p. 181; [9.3.3.3 Truncated Rice binarization process]; p. 421; [9.3.3.11 Binarization process for abs_remainder ]; p. 424.

Supplementary European Search Report in the European application No. 21929659.7, mailed on Jan. 7, 2025. 14 pages.

* cited by examiner

| $\lvert q_k \rvert$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | — | 0 | 1 | 1 | 1 | 1 | 1 | 1 | 1 | 1 | ... |
| par | — | — | 0 | 1 | 0 | 1 | 0 | 1 | 0 | 1 | ... |
| gt3 | — | — | 0 | 0 | 1 | 1 | 1 | 1 | 1 | 1 | ... |
| rem | — | — | — | — | 0 | 0 | 1 | 1 | 2 | 2 | ... |

| $|q_k|$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | – | 0 | 1 | 1 | 1 | 1 | 1 | 1 | 1 | 1 | ... |
| gt2 | – | – | 0 | 1 | 1 | 1 | 1 | 1 | 1 | 1 | ... |
| rem | – | – | – | 0 | 1 | 2 | 3 | 4 | 5 | 6 | ... |

901 — A coefficient block is generated based on a residual block, coefficients in the coefficient block are scanned, and values of the coefficients are entropy encoded 902 — Codewords generated by entropy encoding are written into a bitstream. The operation of entropy encoding the value of the coefficient includes encoding five syntax elements of the coefficient, i.e., a non-zero flag, M flags in which an absolute value of the coefficient is greater than i, a modulo result flag, a remainder of the absolute value of the coefficient, and a sign flag; encoded values of the modulo result flag and the remainder of the absolute value of the coefficient are determined according to a modulo operation of the coefficient on N, i = 1, 2, ···, M, M is a positive integer, N is a positive integer greater than 1

FIG. 9

| $|q_k|$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | – | 0 | 1 | 1 | 1 | 1 | 1 | 1 | 1 | 1 | ... |
| rem_flag | – | – | 1 | 0 | 0 | 1 | 0 | 0 | 1 | 0 | ... |
| | – | – | 1 | 0 | 1 | 0 | 0 | 1 | 0 | 0 | |
| rem | – | – | – | 0 | 0 | 0 | 1 | 1 | 1 | 2 | ... |

FIG. 10

| $\|q_k\|$ | 0 | 2 | 4 | 5 | 0 | 6 | 3 | 7 | 0 | 2 | 1 | 0 | 9 | 3 | 0 | 8 |
|---|---|---|---|---|---|---|---|---|---|---|---|---|---|---|---|---|
| sig | 0 | 1 | 1 | 1 | 0 | 1 | 1 | 1 | 0 | 1 | 1 | 0 | 1 | 1 | 0 | 1 |
| gt1 | - | 1 | 1 | 1 | - | 1 | 1 | 1 | - | 1 | 0 | - | 1 | 1 | - | 1 |
| rem_flag | - | 1 | 0 | 1 | - | 0 | 0 | 0 | - | 1 | - | - | 0 | 0 | - | 1 |
|  | - | 1 | 1 | 0 | - | 0 | 0 | 1 | - | 1 | - | - | 0 | 0 | - | 0 |
| rem | - | - | 0 | 0 | - | 1 | 0 | 1 | - | - | - | - | 2 | 0 | - | 1 |

| $|q_k|$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | – | 0 | 1 | 1 | 1 | 1 | 1 | 1 | 1 | 1 | ... |
| gt2 | – | – | 0 | 1 | 1 | 1 | 1 | 1 | 1 | 1 | ... |
| rem_flag | – | – | – | 0 | 0 | 1 | 1 | 0 | 1 | 1 | ... |
| | – | – | – | 0 | 1 | 0 | 1 | 1 | 0 | 1 | |
| rem | – | – | – | – | 0 | 0 | 0 | 1 | 1 | 1 | ... |

A bitstream is obtained, a current encoding unit is parsed, and positions of coefficients are determined according to a scanning mode used during encoding — 1701

The coefficients are entropy decoded according to the positions, to obtain syntax elements of the coefficients — 1702

Values of the coefficients are determined according to the syntax elements of the coefficients — 1703

FIG. 17

| $|q_k|$ | 0 | 1 | 2 | 3 | 4 | 5 | 6 | 7 | 8 | 9 | 10 | 11 | ... |
|---|---|---|---|---|---|---|---|---|---|---|---|---|---|
| sig | 0 | 1 | 1 | 1 | 1 | 1 | 1 | 1 | 1 | 1 | 1 | 1 | ... |
| gt1 | - | 0 | 1 | 1 | 1 | 1 | 1 | 1 | 1 | 1 | 1 | 1 | ... |
| rem_flag | - | - | 0 | 0 | 1 | 0 | 0 | 0 | 0 | 1 | 0 | 0 | ... |
| | - | - | 1 | 1 | 0 | 0 | 0 | 1 | 1 | 0 | 0 | 0 | ... |
| | - | - | 0 | 1 | 0 | 0 | 1 | 0 | 1 | 1 | 0 | 1 | ... |
| rem | - | - | 0 | 0 | 0 | 0 | 0 | 1 | 1 | 1 | 1 | 1 | ... |

FIG. 18

| $|q_k|$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | — | 0 | 1 | 1 | 1 | 1 | 1 | 1 | 1 | 1 | ... |
| rem_flag | — | — | 0 | 0 | 1 | 1 | 0 | 0 | 1 | 1 | ... |
|  | — | — | 0 | 1 | 0 | 1 | 0 | 1 | 0 | 1 |  |
| rem | — | — | 0 | 0 | 0 | 0 | 1 | 1 | 1 | 1 | ... |

COEFFICIENT ENCODING METHOD, COEFFICIENT DECODING METHOD, ENCODING DEVICE, DECODING DEVICE, AND STORAGE MEDIUM

CROSS-REFERENCE TO RELATED APPLICATION

This is a continuation application of International Patent Application No. PCT/CN2021/080635, filed on Mar. 12, 2021, entitled "COEFFICIENT ENCODING METHOD, COEFFICIENT DECODING METHOD, ENCODING DEVICE, DECODING DEVICE, AND STORAGE MEDIUM", the disclosure of which is hereby incorporated by reference in its entirety.

BACKGROUND

Digital video compression technologies mainly compress huge digital image video data, to facilitate transmission, storage, or the like. With the sharp increase of Internet videos and people's increasing requirements on video definitions, although existing digital video compression standards may save many video data, there is still a need to pursue a better digital video compression technology at present, to reduce bandwidth and flow pressures of digital video transmission.

SUMMARY

Embodiments of the disclosure relate to, but are not limited to video encoding and decoding technologies, and in particular to a coefficient encoding method, a coefficient decoding method, an encoding device, a decoding device, and a storage medium. Overviews of the subject matters described in detail here are as follows. The overviews are not intended to limit the scope of protection of the claims.

An embodiment of the disclosure provides a coefficient decoding method, including the following operations.

An obtained bitstream is parsed, and syntax elements of a to-be-decoded coefficient are decoded.

A value of the to-be-decoded coefficient is determined according to the syntax elements obtained by decoding.

The syntax elements include: a non-zero flag, M flags in which an absolute value is greater than Xi, a modulo result flag, a remainder value, and a sign flag; an absolute value of the to-be-decoded coefficient is a sum obtained by adding a sum of an encoded value of the non-zero flag, encoded values of the M flags in which the absolute value is greater than Xi, and a preset numerical value corresponding to an encoded value of the modulo result flag, to a product of an encoded value of the remainder value and N. The value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, i≥M, i and M are positive integers, N is a positive integer greater than 1, $X_i$ is a positive integer. When values of i are different, values of $X_i$ are different and incremental with the values of i.

An embodiment of the disclosure provides a coefficient encoding method, including the following operations.

A coefficient block is generated based on a residual block, coefficients in the coefficient block are scanned, and syntax elements of a to-be-encoded coefficient are encoded.

Codewords generated by encoding are written into a bitstream.

The syntax elements include: a non-zero flag, M flags in which an absolute value is greater than $X_i$, a modulo result flag, a remainder value, and a sign flag; an absolute value of a to-be-decoded coefficient is a sum obtained by adding a sum of an encoded value of the non-zero flag, encoded values of the M flags in which the absolute value is greater than $X_i$, and a preset numerical value corresponding to an encoded value of the modulo result flag, to a product of an encoded value of the remainder value and N. A value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, i≥M, i and M are positive integers, N is a positive integer greater than 1, $X_i$ is a positive integer. When values of i are different, values of $X_i$ are different and incremental with the values of i.

An embodiment of the disclosure provides a decoding device, including: a processor; and a memory storing a computer program executable by the processor. The processor implements the coefficient decoding method described in the above aspect when the processor executes the computer program.

An embodiment of the disclosure provides an encoding device, including: a processor; and a memory storing a computer program executable by the processor. The processor implements the coefficient encoding method described in the above aspect when the processor executes the computer program.

Other aspects may be apparent after reading and understanding the drawings and detailed descriptions.

BRIEF DESCRIPTION OF THE DRAWINGS

The drawings are used to provide understanding of embodiments of the disclosure, constitute a part of the description, and are used to explain technical solutions of the disclosure together with the embodiments of the disclosure, and do not constitute limitation on the technical solutions of the disclosure.

FIG. 9 is a schematic flowchart of a coefficient encoding method according to an embodiment of the disclosure.

FIG. 10 is a schematic diagram of an encoding mode for an absolute value of a coefficient by taking a modulus of 3 according to an exemplary embodiment of the disclosure.

FIG. 17 is a schematic flowchart of a coefficient decoding method according to an exemplary embodiment of the disclosure.

FIG. 18 is a schematic diagram of an encoding mode for an absolute value of a coefficient by taking a modulus of 5 according to an exemplary embodiment of the disclosure.

DETAILED DESCRIPTION

The disclosure describes various embodiments, however, the description is exemplary, rather than limitation, and it will be apparent to those of ordinary skill in the art that there may be more embodiments and implementations within the scope included in the embodiments described in the disclosure.

In the disclosure, words such as "exemplary", or "for example", or the like are intended to represent an example, illustration, or explanation. Any embodiment described as "exemplary" or "for example" in the disclosure should not be construed as being more preferable or more advantageous than other embodiments.

When a representative exemplary embodiment is described, the description may have presented a method and/or process in a particular sequence of steps. However, the method or process should not be limited to a specific order of steps described here, without relying on the specific order of the steps described here. Other orders of the steps are possible, as will be understood by those of ordinary skill in the art. Therefore, the specific order of the steps set forth in the description should not be construed as limiting the claims. Furthermore, the claims for the method and/or process should not be limited to performing steps thereof in written orders, and it may be easily understood by those skilled in the art that these orders may vary and remain within the spirit and scope of the embodiments of the disclosure.

Video encoding and decoding standards include H.264/Advanced Video encoding (AVC), H.265/High Efficiency Video encoding (HEVC), H.266/Versatile Video encoding (VVC), expansions of these standards, Moving Picture Experts Group (MPEG), Alliance for Open Media (AOM), or any other customized standard, etc. These standards reduce data amount for data transmission and storage by video compression technologies to achieve more efficient video encoding and decoding, transmission and storage.

Figure 1:
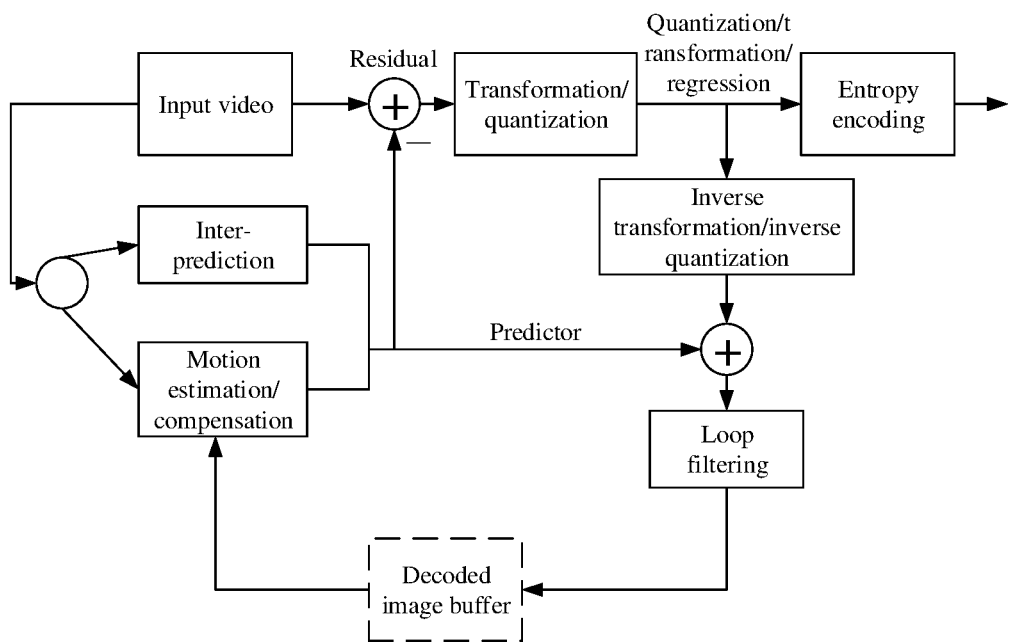
FIG. 1 is a schematic diagram of a video compression encoding frame.

Video compression includes multiple modules configured to reduce or remove redundant intra-prediction (spatial domain) and/or inter-prediction (time domain) in the video, perform transformation and quantization of residual information, and inverse quantization and inverse transformation, perform loop filtering and entropy encoding to improve subjective and objective reconstruction quality, etc. FIG. 1 is a schematic diagram of a video compression encoding frame. As shown in FIG. 1, the frame includes an intra-prediction module, a motion estimation/compensation module, a transform/quantization module, an inverse transform/inverse quantization module, a loop filtering module, an entropy encoding module, or other modules.

Some video compression standards are block-based compression technologies. For example, a video slice, a picture, or a series of pictures may be divided into a Coding Tree Unit (CTU), and then the CTU is divided into an image block taking a Coding Unit (CU) as a basic unit. Intra-prediction refers to performing prediction by using pixels around the block as a reference, inter-prediction refers to performing prediction by referring to information of a spatially neighboring block and reference information in other pictures, and a prediction block of a to-be-encoded unit CU may be obtained by the intra-prediction or the inter-prediction. The residual information represents a pixel difference between an original to-be-encoded CU and a predicted CU, and is also referred to as a residual block. With respect to a prediction signal, the residual block may be transformed, quantized and entropy encoded as a bitstream for transmission or storage. For example, in order to achieve a better compression, the residual information may be transformed from a pixel domain to a transform domain, thereby obtaining residual coefficients. Then, a two-dimensional array may be quantized into a one-dimensional vector according to a coefficient scanning order, and the coefficient subject to transformation and quantization may be applied to entropy encoding to achieve more compression. These video compression technologies are described in the standards and implemented in various fields related to video compression.

Some concepts involved in the embodiments of the disclosure are introduced below.

CU is a basic unit for performing various types of encoding or decoding operations such as CU-based prediction operation, transform operation, entropy encoding operation, or other operations, in a video encoding and decoding process. The CU refers to a two-dimensional sampling point array, which may be a square array, or may be a rectangular array. For example, a 4×8 sized CU may be considered as a square sampling point array composed of 4×8 (32 in total) sampling points. The CU may also be referred to as an image block.

A current CU refers to a CU processed currently, and may also be referred to as a current block. For example, during encoding, the current CU refers to a CU encoded currently; and during decoding, the current CU refers to a CU decoded currently.

A reference CU refers to a CU providing a reference signal for the current CU, and may also be referred to as a reference block. A pixel point of the reference CU refers to a pixel point included in the reference CU.

A prediction CU refers to a CU providing prediction for the current CU, and may also be referred to as a prediction block (a prediction unit (PU)). Each CU may include one or more PUs. The PU may include pixel data in a spatial domain (which may be referred to as a pixel domain).

A residual block refers to a residual image block formed by subtracting a prediction block from a current to-be-encoded block after the prediction block of the current block is generated through inter-prediction and/or intra-prediction, and may also be referred to as residual data.

A transform unit (TU) refers to a block obtained by transforming the residual data and presenting the residual or the transform coefficients, and may also be referred to as a transform block. Each CU may include one or more TUs. For example, the residual data may be transformed into coefficients by using transformations such as discrete cosine transform, integer transform, wavelet transform, or similar transformations, that is, the residual data is transformed from the pixel domain to the transform domain.

A coefficient block includes a transform block obtained by transforming the residual block and containing a transform coefficient, or a residual block which is not transformed and includes the residual data (a residual signal).

In the embodiments of the disclosure, coefficients include a coefficient of the transform block obtained by transforming the residual block, or a coefficient of the residual block. The operation of entropy encoding the coefficients includes: entropy encoding the coefficient of the transform block after it is quantized, or entropy encoding the coefficient of the residual block after it is quantized, when transformation is not applied to the residual data.

An untransformed residual signal and a transformed residual signal may also be collectively referred to as coefficients. In order to perform effective compression, the coefficients need to be quantized in general. The quantized coefficients may also become levels.

Quantization is generally used to reduce a dynamic range of the coefficient, thereby achieving a purpose of expressing a video with fewer codewords. A quantized numerical value is generally referred to as a level. The quantization operation is generally done by dividing the coefficient by a quantization step size, and the quantization step size is determined by a quantization factor transferred in the bitstream. Inverse quantization is done by multiplying the level by the quantization step size. For a block with an N×M size, quantization of all coefficients may be done independently, such technology is widely applied to many international video compression standards, such as H.264, HEVC. In the VVC international video compression standard, the quantization operation may utilize correlation between coefficients, and a better quantization mode is selected by using characteristics of quantized coefficients, to achieve a purpose of optimizing quantization.

Entropy encoding the coefficients includes two parts.

A first part is scanning the coefficients, of which functions include transforming a two-dimensional coefficient block into a one-dimensional coefficient stream.

The scanning order may be diagonal scanning, z-shaped scanning, zig-zag scanning, horizontal scanning, vertical scanning, 4×4 sub-block scanning, or scanning in any one of other orders.

A second part is entropy encoding values of the coefficients, and then writing them into the bitstream.

After the coefficient block is scanned and quantized to form a one-dimensional coefficient stream (or a coefficient string), the coefficients may be entropy encoded according to a context-based adaptive variable-length code (CAVLC), a context-based adaptive binary arithmetic coding (CABAC), a syntax-based adaptive binary arithmetic coding, a probability interval partition entropy (PIPE), a bypass encoding mode, or other entropy encoding modes.

Figure 2:
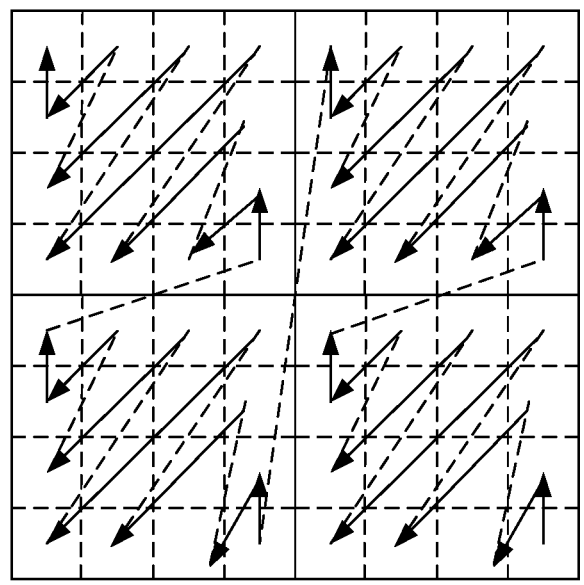
FIG. 2 is a schematic diagram of a diagonal scanning in Versatile Video encoding (VVC).

In VVC, coefficients in a transform block are generally divided into multiple non-overlapping coefficient groups. A size of the coefficient group depends on a size of the transform block, for example, may include 1×16, 2×8, 8×2, 2×4, 4×2, or 16×1, etc. For example, as shown in FIG. 2, a 8×8 transform block is divided into four 4×4 sub-blocks, and then the coefficients are quantized from a two-dimensional vector to a one-dimensional vector in a diagonal scanning mode.

In VVC, after scanning, syntax elements of the coefficient at each position include six parts, i.e., a non-zero flag bit sig_coeff_flag, a flag abs_level_gtx_flag[0] in which an absolute value of the coefficient is greater than 1, a parity check flag par_level_flag, a flag abs_level_gtx_flag[1] in which the absolute value of the coefficient is greater than 3, remainder values abs_remainder and dec_abs_level, and a sign flag bit coeff_sign_flag. The non-zero flag bit indicates whether the absolute value $|q_k|$ of the coefficient is non-zero. The flag in which the absolute value of the coefficient is greater than 1 indicates whether the absolute value $|q_k|$ of the coefficient is greater than 1. The parity check flag indicates whether the absolute value $|q_k|$ of the coefficient is an odd number or an even number. The flag in which the absolute value of the coefficient is greater than 3 indicates whether the absolute value $|q_k|$ of the coefficient is greater than 3. The remainder value indicates a residual value of the coefficient, which may be determined by the following formula: $|q_k|=\text{sig}+\text{gt1}+\text{par}+2\times\text{gt3}+2\times\text{rem}$, $q_k$ is a value of the coefficient, sig is an encoded value of the non-zero flag bit, gt1 is an encoded value of the flag in which the absolute value of the coefficient is greater than 1, par represents an encoded value of the parity check flag, gt3 represents an encoded value of the flag in which the absolute value of the coefficient is greater than 3, and rem represents an encoded value of the residual value of the coefficient. When a certain flag bit does not exist, the value thereof is processed to be 0. The sign flag represents a positive or negative characteristic of the coefficient.

Figures 3, 4:
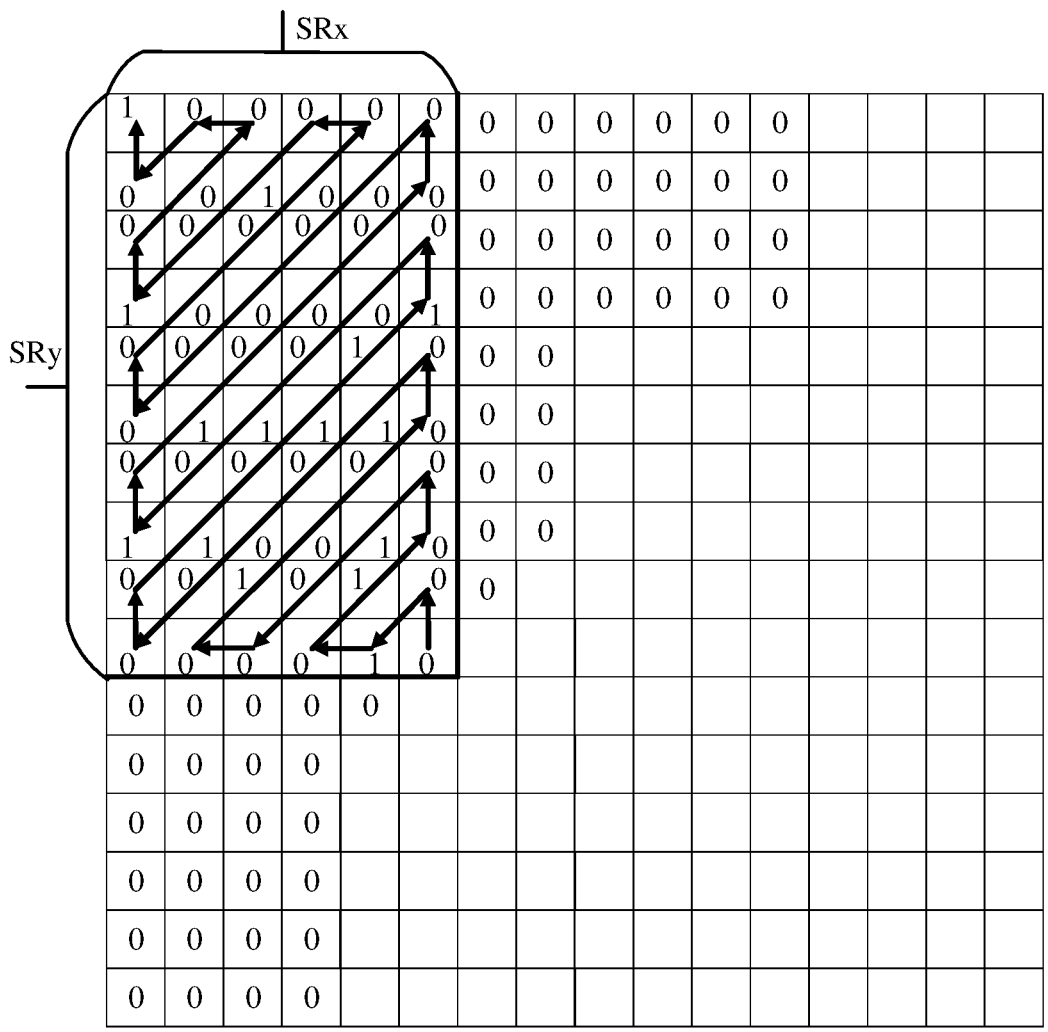
FIG. 3 is a schematic diagram of an encoding mode for an absolute value of a coefficient in VVC.
FIG. 4 is a schematic diagram of an inverse zig-zag scanning in Audio and Video coding Standard (AVS).

In VVC, corresponding relationships between each flag bit included in the syntax elements of the coefficient and the absolute value of the coefficient are shown in FIG. 3.

Based on the encoding mode for the absolute value of the coefficient shown in FIG. 3, a process of entropy encoding the coefficient includes the following operations.

The non-zero flag bit sig_coeff_flag is encoded, and sig_coeff_flag is encoded as 0 when the coefficient is 0, and sig_coeff_flag is encoded as 1 when the coefficient is not 0.

When sig_coeff_flag is encoded as 0, encoding of the flag abs_level_gtx_flag[0] in which an absolute value of the coefficient is greater than 1, the parity check flag par_level_flag, the flag abs_level_gtx_flag[1] in which the absolute value of the coefficient is greater than 3, the remainder values abs_remainder and dec_abs_level, and the sign flag bit coeff_sign_flag are skipped; when sig_coeff_flag is encoded as 1, abs_level_gtx_flag[0] is encoded, and abs_level_gtx_flag[0] is encoded as when the absolute value of the coefficient is 1, and abs_level_gtx_flag[0] is encoded as 1 when the absolute value of the coefficient is greater than 1.

When abs_level_gtx_flag[0] is 0, encoding of the parity check flag par_level_flag, the flag abs_level_gtx_flag[1] in which the absolute value of the coefficient is greater than 3, the remainder values abs_remainder and dec_abs_level are skipped; when abs_level_gtx_flag[0] is 1, par_level_flag is encoded, and par_level_flag is encoded as 0 when the absolute value of the coefficient is an even number, and par_level_flag is encoded as 1 when the absolute value of the coefficient is an odd number.

abs_level_gtx_flag[1] is encoded, and abs_level_gtx_flag[1] is encoded as 0 when the absolute value of the coefficient is not greater than 3, and abs_level_gtx_flag[1] is encoded as 1 when the absolute value of the coefficient is greater than 3.

When abs_level_gtx_flag[1] is 0, encoding of the remainder values abs_remainder and dec_abs_level are skipped, and when abs_level_gtx_flag[1] is 1, abs_remainder and dec_abs_level are encoded.

The remainder value may be determined according to the following formula:

$$|q_k|=\text{sig}+gt1+\text{par}+2\times gt3+2\times \text{rem}.$$

When sig_coeff_flag is encoded as 1, coeff_sign_flag is encoded according to a positive or negative characteristic of the coefficient, and coeff_sign_flag is encoded as when the coefficient is positive, and coeff_sign_flag is encoded as 1 when the coefficient is negative.

The remainder value and the sign flag are encoded by the bypass encoding mode, and flags except the remainder value and the sign flag may be encoded by the context-based adaptive encoding mode.

In Audio and Video coding Standard (AVS), coefficients which need to be encoded are generally defined in a range by a Scan Region based Coefficient Coding (SRCC) technology. For example, as shown in FIG. 4, a mode for scanning coefficients quantizes the coefficients from two-dimensional vectors to one-dimensional vectors by taking a lower right corner in a range of $SR_x$ to $SR_y$ as a starting point and scanning in an inverse zig-zag order.

In AVS, after scanning, syntax elements of the coefficient at each position include five parts, i.e., a non-zero flag bit sig_flag, a flag coeff_abs_level_greater1_flag in which an absolute value of the coefficient is greater than 1, a flag coeff_abs_level_greater2_flag in which the absolute value of the coefficient is greater than 2, a remainder value coeff_abs_level_remaining, and a sign flag coeff_sign. The non-zero flag bit indicates whether the absolute value $|q_k|$ of the coefficient is non-zero. The flag in which the absolute value of the coefficient is greater than 1 indicates whether the absolute value $|q_k|$ of the coefficient is greater than 1. The flag in which the absolute value of the coefficient is greater than 2 indicates whether the absolute value $|q_k|$ of the coefficient is greater than 2. The remainder value indicates a residual value of the coefficient, which may be determined by the following formula: $|q_k|=\text{sig}+gt1+gt2+\text{rem}$, $q_k$ is a value of the coefficient, sig is an encoded value of the non-zero flag bit, gt1 is an encoded value of the flag in which the absolute value of the coefficient is greater than 1, gt2 represents an encoded value of the flag in which the absolute value of the coefficient is greater than 2, and rem represents an encoded value of the residual value of the coefficient. In the formula, when a certain flag bit does not exist, the value thereof is processed to be 0. The sign flag represents a positive or negative characteristic of the coefficient.

Figures 5, 6:
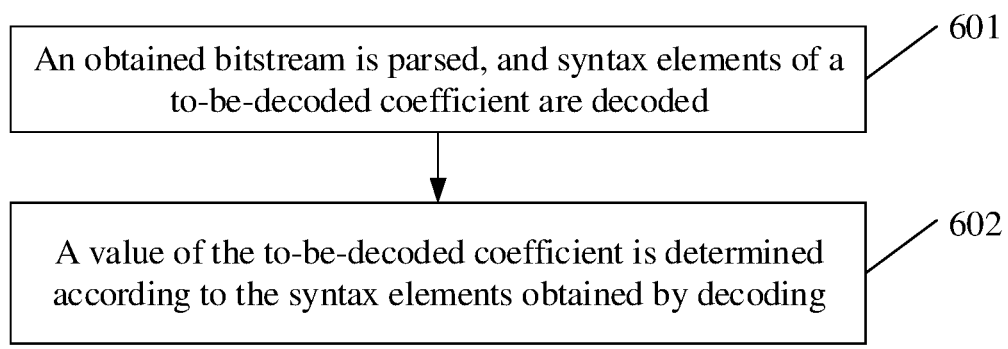
FIG. 5 is a schematic diagram of an encoding mode for an absolute value of a coefficient in AVS.
FIG. 6 is a schematic flowchart of a coefficient decoding method according to an embodiment of the disclosure.

In AVS, corresponding relationships between each flag bit included in the syntax elements of the coefficient $q_k$ and the absolute value of the coefficient are shown in FIG. 5.

Based on the encoding mode for the absolute value of the coefficient shown in FIG. 5, a process of entropy encoding the coefficient includes the following operations.

The non-zero flag bit sig_flag is encoded, and sig_flag is encoded as 0 when the coefficient is 0, and sig_flag is encoded as 1 when the coefficient is not 0.

When sig_flag is encoded as 0, encoding of the flag coeff_abs_level_greater1_flag in which an absolute value of the coefficient is greater than 1, the flag coeff_abs_level_greater2_flag in which the absolute value of the coefficient is greater than 2, the remainder value coeff_abs_level_remaining, and the sign flag coeff_sign are skipped; when sig_flag is encoded as 1, coeff_abs_level_greater1_flag is encoded, and coeff_abs_level_greater1_flag is encoded as 0 when the absolute value of the coefficient is not greater than 1, and coeff_abs_level_greater1_flag is encoded as 1 when the absolute value of the coefficient is greater than 1.

When coeff_abs_level_greater1_flag is 0, encoding of the flag coeff_abs_level_greater2_flag in which the absolute value of the coefficient is greater than 2, and the remainder value coeff_abs_level_remaining are skipped; when coeff_abs_level_greater1_flag is 1, coeff_abs_level_greater2_flag is encoded, and coeff_abs_level_greater2_flag is encoded as 0 when the absolute value of the coefficient is not greater than 2, and coeff_abs_level_greater2_flag is encoded as 1 when the absolute value of the coefficient is greater than 2.

When coeff_abs_level_greater2_flag is 0, encoding of the remainder value coeff_abs_level_remaining is skipped, and when coeff_abs_level_greater2_flag is 1, the remainder value coeff_abs_level_remaining is encoded.

coeff_abs_level_remaining may be determined according to the following formula: $|q_k|=\text{sig}+gt1+gt2+\text{rem}$.

When sig_flag is encoded as 1, coeff_sign is encoded according to a positive or negative characteristic of the coefficient, and coeff_sign is encoded as 0 when the coefficient is positive, and coeff_sign is encoded as 1 when the coefficient is negative.

The remainder value and the sign flag are encoded by the bypass encoding mode, and flags except the remainder value and the sign flag may be encoded by the context-based adaptive encoding mode.

After scanning, there are many statistical characteristics among the coefficients at respective positions, however, the above encoding modes are relatively single, and CABAC does not fully utilize these statistical characteristics. Therefore, there is a lot of space for improving current coefficient entropy encoding methods.

An embodiment of the disclosure provides a coefficient decoding method, as shown in FIG. 6, the method includes the following operations 601 and 602.

At operation 601, an obtained bitstream is parsed, and syntax elements of a to-be-decoded coefficient are decoded.

At operation 602, a value of the to-be-decoded coefficient is determined according to the syntax elements obtained by decoding.

The syntax elements include: a non-zero flag, M flags in which an absolute value is greater than $X_i$, a modulo result flag, a remainder value, and a sign flag; an absolute value of the to-be-decoded coefficient is a sum obtained by adding a sum of an encoded value of the non-zero flag, encoded values of the M flags in which the absolute value is greater than $X_i$, and a preset numerical value corresponding to an encoded value of the modulo result flag, to a product of an encoded value of the remainder value and N; the value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, i≥M, i and M are positive integers, N is a positive integer greater than 1, $X_i$ is a positive integer, and when values of i are different, values of $X_i$ are different and incremental with the values of i.

In an exemplary embodiment, the method further includes the following operations.

A specific encoded value is preset for the modulo result flag of a specified absolute value.

The non-zero flag is decoded, and when the non-zero flag is decoded as 0, decoding of M flags in which the absolute value of the coefficient is greater than i, the modulo result flag, the remainder value and the sign flag are skipped.

When the non-zero flag is decoded as 1, the M flags in which the absolute value is greater than $X_i$ are decoded. When a g-th flag in which the absolute value is greater than $X_i$ is decoded as 0, 1≤g≤M, decoding of subsequent (M-g) flags in which the absolute value is greater than $X_i$, the modulo result flag and the remainder value are skipped.

The modulo result flag is decoded when each of the M flags in which the absolute value of the coefficient is greater than i is 1.

Decoding of the remainder value is skipped when the encoded value of the modulo result flag is decoded as the specific encoded value.

The remainder value is decoded when the modulo result flag is not decoded as the specific encoded value.

The sign flag is decoded when the non-zero flag is decoded as 1.

In an exemplary embodiment, the method further includes the following operations.

The non-zero flag is decoded, and when the non-zero flag is decoded as 0, decoding of M flags in which the absolute value of the coefficient is greater than i, the modulo result flag, the remainder value and the sign flag are skipped.

When the non-zero flag is decoded as 1, the M flags in which the absolute value is greater than $X_i$ are decoded. When a g-th flag in which the absolute value is greater than $X_i$ is decoded as 0, 1≤g≤M, decoding of subsequent (M-g) flags in which the absolute value is greater than $X_i$, the modulo result flag and the remainder value are skipped. When values of i are different, values of $X_i$ are different and incremental with the values of i.

The modulo result flag and the remainder value are sequentially decoded when each of the M flags in which the absolute value is greater than $X_i$ is 1.

The sign flag is decoded when the non-zero flag is decoded as 1.

In an exemplary embodiment, the method further includes the following operations.

The absolute value of the coefficient=the decoded value of the non-zero flag+decoded values respectively corresponding to the M flags in which the absolute value is greater than $X_i$+a preset numerical value corresponding to a decoded value of the modulo result flag+the remainder value×N.

A decoded value of an absent syntax element or a corresponding preset numerical value is 0, when any one syntax element of the following is absent: the decoded value of the non-zero flag, the decoded values respectively corresponding to the M flags in which the absolute value is greater than $X_i$, the decoded value of the modulo result flag and the remainder value.

In an exemplary embodiment, M=1, 2 or 3, and N=2, 3, 4 or 5.

In an exemplary embodiment M=1, $X_1$=1, N=3, the specified absolute value is 2, and the specific encoded value preset for the modulo result flag of the specified absolute value of the coefficient is 11B.

Alternatively, M=2, $X_1$=1, $X_2$=2, N=3, the specified absolute value is 3, and the specific encoded value preset for the modulo result flag of the specified absolute value of the coefficient is 00B.

In an exemplary embodiment, M=1, $X_1$=1, and N=3.

A corresponding preset numerical value is 0 when the modulo result flag is decoded as 11B.

The corresponding preset numerical value is 1 when the modulo result flag is decoded as 00B.

The corresponding preset numerical value is 2 when the modulo result flag is decoded as 01B.

The corresponding preset numerical value is 3 when the modulo result flag is decoded as 10B.

In an exemplary embodiment, M=2, $X_1$=1, $X_2$=2, and N=3.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

In an exemplary embodiment, M=1, $X_1$=1, and N=4.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

Figure 7:
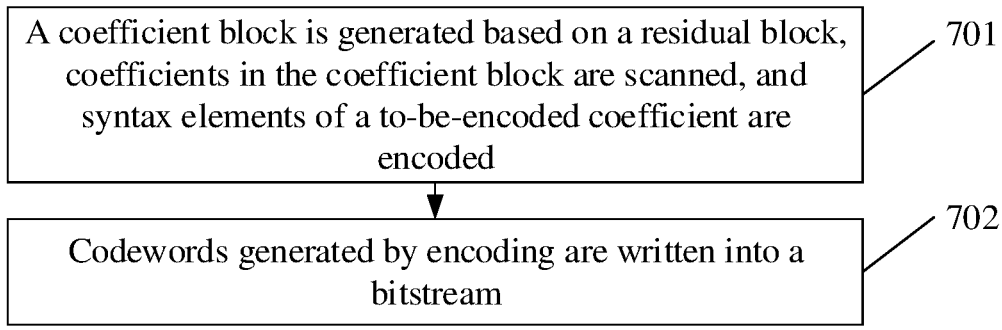
FIG. 7 is a schematic flowchart of a coefficient encoding method according to an embodiment of the disclosure.

An embodiment of the disclosure provides a coefficient encoding method, as shown in FIG. 7, the method includes the following operations 701 and 702.

At operation 701, a coefficient block is generated based on a residual block, coefficients in the coefficient block are scanned, and syntax elements of a to-be-encoded coefficient are encoded.

At operation 702, codewords generated by encoding are written into a bitstream.

The syntax elements include: a non-zero flag, M flags in which an absolute value is greater than $X_i$, a modulo result flag, a remainder value, and a sign flag; an absolute value of a to-be-decoded coefficient is a sum obtained by adding a sum of an encoded value of the non-zero flag, encoded values of the M flags in which the absolute value is greater than $X_i$, and a preset numerical value corresponding to an encoded value of the modulo result flag, to a product of an encoded value of the remainder value and N; a value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, i≥M, i and M are positive integers, N is a positive integer greater than 1, $X_i$ is a positive integer, and when values of i are different, values of $X_i$ are different and incremental with the values of i.

In an exemplary embodiment, encoding of the modulo result flag is binary encoding and occupies K flag bits, and the binary encoding of the modulo result flag includes $2^K$ types of binary encoding.

The method further includes the following operations.

A specific encoded value is preset for the modulo result flag of a specified absolute value of the coefficient.

The non-zero flag is encoded. The non-zero flag is encoded as 0 and encoding of M flags in which the absolute value of the coefficient is greater than i, the modulo result flag, the remainder value and the sign flag are skipped when the absolute value of the coefficient is 0; and the non-zero flag is encoded as 1 when the absolute value of the coefficient is not 0.

When the non-zero flag is encoded as 1, the M flags in which the absolute value is greater than $X_i$ are sequentially encoded. When the absolute value of the coefficient is Q, a flag in which $X_i$ is greater than Q and the absolute value is greater than $X_i$ is encoded as 0, and encoding of subsequent flags in which the absolute value is greater than $X_i$ is skipped; and a flag in which $X_i$ is less than or equal to Q and the absolute value is greater than $X_i$ is encoded as 1.

Encoding of the modulo result flag and the remainder value are skipped when any one of the M flags in which the absolute value is greater than $X_i$ is encoded as 0; the modulo result flag is encoded when each of the M flags in which the absolute value is greater than $X_i$ is encoded as 1. The modulo result flag is encoded as the specific encoded value when the absolute value of the coefficient is the specified absolute value of the coefficient, the specific encoded value has a global uniqueness; and when the absolute value of the coefficient is not the specified absolute value of the coefficient, $(2^K-N)$ types of binary encoding are encoded as modulo result flags of coefficients having absolute values of M+1 to $M+2^K-N$, and encoded values of the $(2^K-N)$ types of binary encoding are defined as 0 to $2^K-N-1$ respectively; remaining N types of binary encoding are encoded as modulo result flags of coefficients having absolute values greater than $M+2^K-N$ respectively, and encoded values of the N types of binary encoding are defined as 1 to N respectively.

The remainder value is encoded, and the remainder value is encoded as a quotient value when the absolute value of the coefficient is not the specified absolute value of the coefficient. The quotient value is obtained by subtracting the encoded value corresponding to the non-zero flag, encoded values respectively corresponding to the M flags in which the absolute value of the coefficient is greater than i, and the preset numerical value corresponding to the encoded value of the modulo result flag from the absolute value of the coefficient and then dividing by N. The preset numerical value corresponding to the encoded value of the modulo result flag satisfies that the calculated quotient value is an integer.

The sign flag is encoded when the non-zero flag is encoded as 1. The sign flag is encoded as 0 when the coefficient is positive, and the sign flag is encoded as 1 when the coefficient is negative.

In an exemplary embodiment, encoding of the modulo result flag is binary encoding and occupies K flag bits, and the binary encoding of the modulo result flag includes $2^K$ types of binary encoding.

The method further includes the following operations.

The non-zero flag is encoded. The non-zero flag is encoded as 0 and encoding of M flags in which the absolute value of the coefficient is greater than i, the modulo result flag, the remainder value and the sign flag are skipped when the absolute value of the coefficient is 0; and the non-zero flag is encoded as 1 when the absolute value of the coefficient is not 0.

The M flags in which the absolute value is greater than $X_i$ are sequentially encoded when the non-zero flag is encoded as 1. When the absolute value of the coefficient is Q, a flag in which $X_i$ is greater than Q and the absolute value is greater than $X_i$ is encoded as 0, and encoding of subsequent flags in which the absolute value is greater than $X_i$ is skipped; and a flag in which $X_i$ is less than or equal to Q and the absolute value is greater than $X_i$ is encoded as 1.

Encoding of the modulo result flag and the remainder value are skipped when any one of the M flags in which the absolute value is greater than $X_i$ is encoded as 0; and the modulo result flag is encoded when each of the M flags in which the absolute value is greater than $X_i$ is encoded as 1. $(2^K-N)$ types of binary encoding are encoded as modulo result flags of coefficients having absolute values of M+1 to $M+2^K-N$, and encoded values of the $(2^K-mN)$ types of binary encoding are defined as 0 to $2^K-N-1$ respectively; remaining N types of binary encoding are encoded as modulo result flags of coefficients having absolute values greater than $M+2^K-N$ respectively, and encoded values of the N types of binary encoding are defined as 1 to N respectively.

The remainder value is encoded, and the remainder value is encoded as a quotient value when each of the M flags in which the absolute value is greater than $X_i$ is encoded as 1. The quotient value is obtained by subtracting the encoded value corresponding to the non-zero flag, encoded values respectively corresponding to the M flags in which the absolute value of the coefficient is greater than i, and the preset numerical value corresponding to the encoded value of the modulo result flag from the absolute value of the coefficient and then dividing by N. The preset numerical value corresponding to the encoded value of the modulo result flag satisfies that the calculated quotient value is an integer.

The sign flag is encoded when the non-zero flag is encoded as 1. The sign flag is encoded as 0 when the coefficient is positive, and the sign flag is encoded as 1 when the coefficient is negative.

In an exemplary embodiment, M=1, 2 or 3, and N=2, 3, 4 or 5.

In an exemplary embodiment, M=1, $X_1$=1, N=3, K=2, the specified absolute value of the coefficient is 2, and the specific encoded value preset for the modulo result flag of the specified absolute value is 11B; the modulo result flag of a coefficient in which a remainder of 0 is obtained by an absolute value of the coefficient divided by 3 is encoded as 00B, the modulo result flag of a coefficient in which a remainder of 1 is obtained by an absolute value of the coefficient divided by 3 is encoded as 01B, and the modulo result flag of a coefficient in which a remainder of 2 is obtained by an absolute value of the coefficient divided by 3 is encoded as 10B.

A corresponding preset numerical value is 0 when the modulo result flag is encoded as 11B.

The corresponding preset numerical value is 1 when the modulo result flag is encoded as 00B.

The corresponding preset numerical value is 2 when the modulo result flag is encoded as 01B.

The corresponding preset numerical value is 3 when the modulo result flag is encoded as 10B.

In an exemplary embodiment, M=2, $X_1$=1, $X_2$=2, N=3, K=2, the specified absolute value of the coefficient is 3, and the specific encoded value preset for the modulo result flag of the specified absolute value of the coefficient is 00B; the modulo result flag of a coefficient in which a remainder of 0 is obtained by an absolute value of the coefficient divided by 3 is encoded as 11B, the modulo result flag of a coefficient in which a remainder of 1 is obtained by an absolute value of the coefficient divided by 3 is encoded as 01B, and the modulo result flag of a coefficient in which a remainder of 2 is obtained by an absolute value of the coefficient divided by 3 is encoded as 10B.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

In an exemplary embodiment, M=1, $X_1$=1, N=4, K=2, the modulo result flag of a coefficient in which a remainder of 0 is obtained by an absolute value of the coefficient divided by 4 is encoded as 10B, the modulo result flag of a coefficient in which a remainder of 1 is obtained by an absolute value of the coefficient divided by 4 is encoded as 11B, the modulo result flag of a coefficient in which a remainder of 2 is obtained by an absolute value of the coefficient divided by 4 is encoded as 00B, and the modulo result flag of a coefficient in which a remainder of 3 is obtained by an absolute value of the coefficient divided by 4 is encoded as 01B.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

Figure 8:
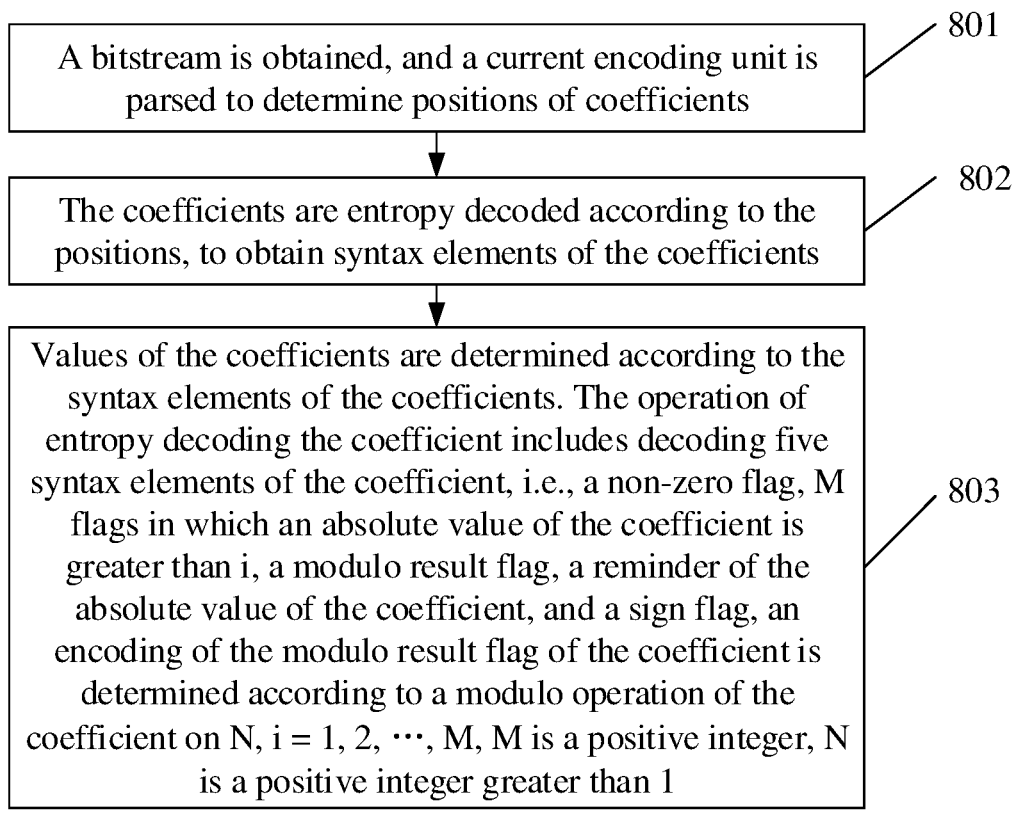
FIG. 8 is a schematic flowchart of a coefficient decoding method according to an embodiment of the disclosure.

An embodiment of the disclosure provides a coefficient decoding method, as shown in FIG. 8, the method includes the following operations 801 to 803.

At operation 801, a bitstream is obtained, and a current encoding unit is parsed to determine positions of coefficients.

At operation 802, the coefficients are entropy decoded according to the positions, to obtain syntax elements of the coefficients.

At operation 803, values of the coefficients are determined according to the syntax elements of the coefficients.

The operation of entropy decoding the coefficient includes decoding five syntax elements of the coefficient, i.e., a non-zero flag, M flags in which an absolute value is greater than $X_i$, a modulo result flag, a remainder value, and a sign flag, encoding of the modulo result flag and the remainder value are determined according to a modulo operation of the coefficient on N, i≥M, i and M are positive integers, N is a positive integer greater than 1.

In an exemplary embodiment, when a specific encoded value is preset for the modulo result flag of a specified absolute value of the coefficient, the operation of entropy decoding the coefficient is implemented in a manner as follows.

The non-zero flag is decoded, and when the non-zero flag is decoded as 0, decoding of M flags in which an absolute value of the coefficient is greater than i, the modulo result flag, the remainder value and the sign flag are skipped.

The M flags in which the absolute value is greater than $X_i$ are sequentially decoded when the non-zero flag is decoded as 1. Decoding of subsequent (M-g) flags in which the absolute value is greater than $X_i$, the modulo result flag and the remainder value are skipped when a g-th flag in which the absolute value is greater than $X_i$ is decoded as 0, 1≤g≤M. When values of i are different, values of $X_i$ are different and incremental with the values of i.

The modulo result flag is decoded when each of the M flags in which the absolute value of the coefficient is greater than i is 1.

Decoding of the remainder value is skipped when the modulo result flag is decoded as the specific encoded value.

The remainder value is decoded when the modulo result flag is not decoded as the specific encoded value.

The sign flag is decoded when the non-zero flag is decoded as 1.

In an exemplary embodiment, the operation of entropy decoding the coefficient is implemented in a manner as follows.

The non-zero flag is decoded. Decoding of M flags in which an absolute value of the coefficient is greater than i, the modulo result flag, the remainder value and the sign flag are skipped when the non-zero flag is decoded as 0.

The M flags in which the absolute value is greater than $X_i$ are sequentially decoded when the non-zero flag is decoded as 1. Decoding of subsequent (M-g) flags in which the absolute value is greater than $X_i$, the modulo result flag and the remainder value are skipped when a g-th flag in which the absolute value is greater than $X_i$ is decoded as 0, 1≤g≤M. When values of i are different, values of $X_i$ are different and incremental with the values of i.

The modulo result flag and the remainder value are sequentially decoded when each of the M flags in which the absolute value of the coefficient is greater than i is 1.

The sign flag is decoded when the non-zero flag is decoded as 1.

In an exemplary embodiment, the operation of determining the values of the coefficients according to the syntax elements of the coefficients is implemented in a manner as follows.

A sum obtained by adding the decoded value of the non-zero flag, decoded values respectively corresponding to the M flags in which the absolute value is greater than Xi, a preset numerical value corresponding to a decoded value of the modulo result flag and the remainder value×N, is used as the absolute value of the coefficient. The value of the coefficient is positive when the sign flag is 0, and the value of the coefficient is negative when the sign flag is 1; the modulo operation is a modulo operation on N.

A decoded value of an absent syntax element is 0, when any one of the following syntax elements is absent: the decoded value of the non-zero flag, the decoded values respectively corresponding to the M flags in which the absolute value is greater than $X_i$, the decoded value of the modulo result flag and the remainder value.

In an exemplary embodiment, when a specific encoded value is preset for the modulo result flag of a specified absolute value of the coefficient, the operation of determining the values of the coefficients according to the syntax elements of the coefficients is implemented in any one of manners as follows.

When the non-zero flag is decoded as 0, it is determined that the value of the coefficient is 0.

When the non-zero flag is decoded as 1 and not all of the M flags in which the absolute value is greater than $X_i$ are 1, $X_i$ value corresponding to a flag with a value of 0 among the M flags in which the absolute value is greater than $X_i$, is used as the absolute value of the coefficient. The value of the coefficient is positive when the sign flag is 0, and the value of the coefficient is negative when the sign flag is 1.

When the non-zero flag is decoded as 1, each of the M flags in which the absolute value is greater than $X_i$ is 1, and the modulo result flag is the specific encoded value, the specified absolute value of the coefficient is used as the absolute value of the coefficient. The value of the coefficient is positive when the sign flag is 0, and the value of the coefficient is negative when the sign flag is 1.

When the non-zero flag is decoded as 1 and each of the M flags in which the absolute value is greater than $X_i$ is 1, a sum obtained by adding the decoded value of the non-zero flag, decoded values corresponding to the M flags in which the absolute value is greater than $X_i$ respectively, a preset numerical value corresponding to an encoded value of the modulo result flag and the remainder value×N, is used as the absolute value of the coefficient. The value of the coefficient is positive when the sign flag is 0, and the value of the coefficient is negative when the sign flag is 1; the modulo operation is a modulo operation on N.

In an exemplary embodiment, M=1, 2 or 3, N=2, 3, 4 or 5.

An embodiment of the disclosure provides a coefficient encoding method, as shown in FIG. 9, the method includes the following operations 901 and 902.

At operation 901, a coefficient block is generated based on a residual block, coefficients in the coefficient block are scanned, and values of the coefficients are entropy encoded.

At operation 902, codewords generated by entropy encoding are written into a bitstream.

The operation of entropy encoding the values of the coefficients includes encoding five syntax elements of the coefficient, i.e., a non-zero flag, M flags in which an absolute value is greater than $X_i$, a modulo result flag, a remainder value, and a sign flag. Encoded values of the modulo result flag and the remainder value are determined according to a modulo operation of the coefficient on N, i≥M, i and M are positive integers, N is a positive integer greater than 1.

In an exemplary embodiment, during entropy encoding the values of the coefficients, encoding of the modulo result flag is implemented in any one of manners as follows.

A specific encoded value is preset for the modulo result flag of a specified absolute value of the coefficient, and when an absolute value of the coefficient is the specified absolute value of the coefficient, the modulo result flag is encoded as the specific encoded value, and the corresponding encoded value has a global uniqueness.

A specific encoded value is preset for the modulo result flag of the specified absolute value of the coefficient, and when the absolute value of the coefficient is not the specified absolute value of the coefficient, the modulo result flag is encoded as an encoded value preset for a remainder, the remainder is obtained by a modulo operation of the absolute value of the coefficient on N; or the remainder is obtained by a modulo operation of a difference, which is calculated by subtracting the non-zero flag and the M flags in which the absolute value of the coefficient is greater than i from the absolute value of the coefficient, on N.

The modulo result flag is encoded as an encoded value preset for the remainder obtained by the modulo operation of the absolute value of the coefficient on N.

The modulo result flag is encoded as an encoded value preset for the remainder obtained by a modulo operation of a difference, which is calculated by subtracting the non-zero flag and the M flags in which the absolute value of the coefficient is greater than i from the absolute value of the coefficient, on N.

The preset encoded value is a binary encoded value, and each remainder corresponds to a binary encoded value.

In an exemplary embodiment, during entropy encoding the values of the coefficients, encoding of the remainder value is implemented in any one of manners as follows.

When the absolute value of the coefficient is the specified absolute value of the coefficient, encoding of the remainder value is skipped.

When the modulo result flag is encoded as the remainder, the remainder value is encoded as a quotient value, the quotient value is obtained by subtracting the encoded value respectively corresponding to the non-zero flag, encoded values corresponding to the M flags in which the absolute value is greater than $X_i$, and a preset numerical value corresponding to the encoded value of the modulo result flag from the absolute value of the coefficient and then dividing by N. The preset numerical value corresponding to the encoded value of the modulo result flag satisfies that the calculated quotient value is an integer.

In an exemplary embodiment, during entropy encoding the values of the coefficients, encoding of the M flags in which the absolute value of the coefficient is greater than i is implemented in any one of manners as follows.

The M flags in which the absolute value is greater than $X_i$ are sequentially encoded when the non-zero flag is encoded as 1. When the absolute value of the coefficient is Q, a flag in which $X_i$ is greater than Q and the absolute value is greater than $X_i$ is encoded as 0, and encoding of subsequent flags in which the absolute value is greater than $X_i$ is skipped; a flag in which $X_i$ is less than or equal to Q and the absolute value is greater than $X_i$ is encoded as 1.

In an exemplary embodiment, during entropy encoding the coefficient, when the absolute value of the coefficient is 0, the non-zero flag is encoded as 0, and encoding of the M flags in which the absolute value of the coefficient is greater than i, the modulo result flag, the remainder value and the sign flag are skipped.

When the absolute value of the coefficient is not 0, the non-zero flag, the M flags in which the absolute value of the coefficient is greater than i, the modulo result flag, the remainder value and the sign flag are sequentially encoded. Encoding of the modulo result flag and the remainder value are skipped when the non-zero flag is encoded as 1 and not all of the M flags in which the absolute value of the coefficient is greater than i are 1.

In an exemplary embodiment, when N is not greater than 4, the encoded value preset for the modulo result flag is represented by two-bit binary.

In an exemplary embodiment, encoding of the modulo result flag is a binary encoding and occupies K flag bits, and the binary encoding of the modulo result flag includes $2^K$ types of binary encoding.

When the value of the coefficient is entropy encoded, $(2^K-N)$ types of binary encoding are encoded as modulo result flags of coefficients having absolute values of M+1 to $M+2^K-N$, and encoded values of the $(2^K-N)$ types of binary encoding are defined as 0 to $2^K-N-1$ respectively; remaining N types of binary encoding are encoded as modulo result flags of coefficients having absolute values greater than $M+2^K-N$ respectively, and encoded values of the N types of binary encoding are defined as 1 to N respectively.

In an exemplary embodiment, N=3, K=2, M=1, the modulo result flag of the coefficient whose absolute value is 2 is encoded as 11B, the modulo result flag in which a remainder of 0 is obtained by the absolute value of the coefficient divided by 3 is encoded as 00B, the modulo result flag in which a remainder of 1 is obtained by the absolute value of the coefficient divided by 3 is encoded as 01B, the modulo result flag in which a remainder of 2 is obtained by the absolute value of the coefficient divided by 3 is encoded as 10B. The encoded value of the remainder value rem is determined by calculating as follows: $|q_k|$=sig+gt1+f(rem_flag)+3×rem, here $q_k$ is the coefficient, $|q_k|$ is the absolute value of the coefficient, sig is the encoded value of the non-zero flag, gt1 is the encoded value of the flag in which the absolute value of the coefficient is greater than 1, rem_flag is the encoded value of the modulo result flag, and f(rem_flag) is a preset numerical value corresponding to rem_flag. The corresponding f(rem_flag) is 0 when the encoded value rem_flag of the modulo result flag is 11B, the corresponding f(rem_flag) is 1 when the encoded value rem_flag of the modulo result flag is 00B, the corresponding f(rem_flag) is 2 when the encoded value rem_flag of the modulo result flag is 01B, and the corresponding f(rem_flag) is 3 when the encoded value rem_flag of the modulo result flag is 10B.

In an exemplary embodiment, N=3, K=2, M=2, the modulo result flag of the coefficient whose absolute value is 3 is encoded as 00B, the modulo result flag in which a remainder of 0 is obtained by the absolute value of the coefficient divided by 3 is encoded as 11B, the modulo result flag in which a remainder of 1 is obtained by the absolute value of the coefficient divided by 3 is encoded as 01B, the modulo result flag in which a remainder of 2 is obtained by the absolute value of the coefficient divided by 3 is encoded as 10B. The encoded value of the remainder value rem is determined by calculating as follows: $|q_k|$=sig+gt1+gt2+f(rem_flag)+3×rem, here q k is the coefficient, $|q_k|$ is the absolute value of the coefficient, sig is the encoded value of the non-zero flag, gt1 is the encoded value of the flag in which the absolute value of the coefficient is greater than 1, gt2 is the encoded value of the flag in which the absolute value of the coefficient is greater than 2, rem_flag is the encoded value of the modulo result flag, and f(rem_flag) is a preset numerical value corresponding to rem_flag. The corresponding f(rem_flag) is 0 when the encoded value rem_flag of the modulo result flag is 00B, the corresponding f(rem_flag) is 1 when the encoded value rem_flag of the modulo result flag is 01B, the corresponding f(rem_flag) is 2 when the encoded value rem_flag of the modulo result flag is 10B, and the corresponding f(rem_flag) is 3 when the encoded value rem_flag of the modulo result flag is 11B.

In an exemplary embodiment, encoding of the modulo result flag is binary encoding, and the binary encoding of the modulo result flag includes N types of binary encoding.

When the value of the coefficient is entropy encoded, binary encoding preset for a remainder obtained by a modulo operation of a difference, which is calculated by subtracting the encoded value of the non-zero flag and encoded values of the M flags in which the absolute value of the coefficient is greater than i from the absolute value of the coefficient, on N is the encoded value of the modulo result flag of the coefficient.

In an exemplary embodiment, N=4, K=2, M=1, the modulo result flag in which a remainder of 0 is obtained by the absolute value of the coefficient divided by 4 is encoded as 10B, the modulo result flag in which a remainder of 1 is obtained by the absolute value of the coefficient divided by 4 is encoded as 11B, the modulo result flag in which a remainder of 2 is obtained by the absolute value of the coefficient divided by 4 is encoded as 00B, the modulo result flag in which a remainder of 3 is obtained by the absolute value of the coefficient divided by 4 is encoded as 01B. The encoded value of the remainder value rem is determined by calculating as follows: $|q_k|$=sig+gt1+g(rem_flag)+4×rem, here $q_k$ is the coefficient, $|q_k|$ is the absolute value of the coefficient, sig is the encoded value of the non-zero flag, gt1 is the encoded value of the flag in which the absolute value of the coefficient is greater than 1, rem_flag is the encoded value of the modulo result flag, and g(rem_flag) is a preset numerical value corresponding to rem_flag. The corresponding g(rem_flag) is 0 when the encoded value rem_flag of the modulo result flag is 00B, the corresponding g(rem_flag) is 1 when the encoded value rem_flag of the modulo result flag is 01B, the corresponding g(rem_flag) is 2 when the encoded value rem_flag of the modulo result flag is 10B, and the corresponding g(rem_flag) is 3 when the encoded value rem_flag of the modulo result flag is 11B.

In the embodiment of the disclosure, the syntax elements of the coefficient include five parts, i.e., the non-zero flag sig, the flag gti in which the absolute value of the coefficient is greater than i, the modulo result flag rem_flag, the remainder value rem, and the sign flag coeff_sign.

The non-zero flag sig indicates whether the coefficient is non-zero.

The flag gti in which the absolute value of the coefficient is greater than i indicates whether the absolute value of the coefficient is greater than i. For example, the flag gti in which the absolute value of the coefficient is greater than i includes at least the flag gt1 in which the absolute value of the coefficient is greater than 1. The flag gti in which the absolute value of the coefficient is greater than i may also be referred to as a flag in which the absolute value is greater than $X_i$.

An encoded value required by the modulo result flag rem_flag is determined by the numerical value of the modulus and the obtained remainder. In an example, the modulo result flag may be encoded as the encoded value corresponding to the remainder, the remainder is obtained by a modulo operation of the absolute value of the coefficient on N; or the remainder is obtained by a modulo operation of a difference, which is calculated by subtracting the non-zero flag and the M flags in which the absolute value of the coefficient is greater than i from the absolute value of the coefficient, on N. In another example, the specific encoded value may be preset for the modulo result flag of the specified absolute value of the coefficient, and when the absolute value of the coefficient is the specified absolute value of the coefficient, the modulo result flag is encoded as the specific encoded value, specific encoding has a global uniqueness. In another example, the specific encoded value may be preset for the modulo result flag of the specified absolute value of the coefficient, and when the absolute value of the coefficient is not the specified absolute value of the coefficient, the modulo result flag is encoded as an encoded value corresponding to a remainder. The remainder is a remainder obtained by a modulo operation of the absolute value of the coefficient on N; or the remainder is a remainder obtained by a modulo operation of a difference, which is calculated by subtracting the non-zero flag and the M flags in which the absolute value of the coefficient is greater than i from the absolute value of the coefficient, on N.

A encoded value required by the remainder value rem is determined by a quotient value. The quotient value is obtained by subtracting the encoded value corresponding to the non-zero flag, encoded values respectively corresponding to the M flags in which the absolute value of the coefficient is greater than i, and a preset numerical value corresponding to the encoded value of the modulo result flag from the absolute value of the coefficient and then dividing by N. The preset numerical value corresponding to the encoded value of the modulo result flag satisfies that the calculated quotient value is an integer.

The sign flag coeff_sign indicates a positive or negative characteristic of the level.

In an exemplary embodiment, the technical solution of the embodiment of the disclosure is described in detail by taking modulus of 3 as an example.

In the exemplary embodiment, the syntax elements of the coefficient include: the non-zero flag sig, the flag gt1 in which the absolute value of the coefficient is greater than 1, the modulo result flag rem_flag, the remainder value rem, and the sign flag coeff_sign. The modulo result flag rem_flag is represented by two-bit binary.

In the exemplary embodiment, in case that the modulus of 3 is taken, a coefficient encoding mode is shown in FIG. 10, the values of respective flags satisfy formula 1: $|q_k|$=sig+gt1+f(rem_flag)+3×rem. In formula 1, when any one of the non-zero flag sig, the flag gt1 in which the absolute value of the coefficient is greater than 1, the modulo result flag rem_flag and the remainder value rem is absent, a value in the formula corresponding to the absent flag is processed as 0.

In the exemplary embodiment, rem_flag is a binary encoded value, f(rem_flag) is a numerical value corresponding to rem_flag and represented by decimalism, corresponding relationships between rem_flag and f(rem_flag) are as shown in Table 1.

TABLE 1

| rem_flag | 11 | 00 | 01 | 10 |
|---|---|---|---|---|
| f(rem_flag) | 0 | 1 | 2 | 3 |

Figure 11:
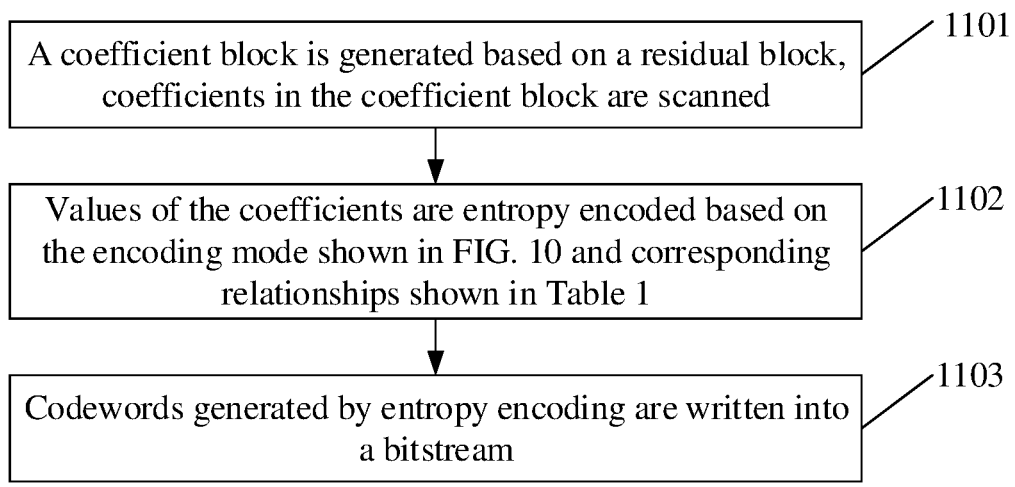
FIG. 11 is a schematic flowchart of a coefficient encoding method according to an exemplary embodiment of the disclosure.

In the exemplary embodiment, the encoded value of the modulo result flag rem_flag corresponding to the coefficient with the absolute value of 2 is preset to be 11B. Based on the encoding mode shown in FIG. 10 and corresponding relationships shown in Table 1, the exemplary embodiment provides a coefficient entropy encoding method, as shown in FIG. 11, the method includes the following operations 1101 to 1103.

At operation 1101, a coefficient block is generated based on a residual block, coefficients in the coefficient block are scanned.

In an exemplary embodiment, a current block passes through a prediction part, that is, the current block is predicted by inter-prediction, or intra-prediction, or other modes, to obtain a prediction block; an image block at a position corresponding to coordinates of the prediction block or the like is taken from an original image, to obtain a difference between the image block and the prediction block so as to obtain a residual block of the current block. Then, the residual block is transformed or not transformed, to obtain a transform block containing a transformed coefficient or a coefficient block without transformation, which are collectively referred to as a coefficient block here. Then, the coefficient block is quantized, and quantized coefficients are entropy encoded according to a coefficient scanning order.

In an exemplary embodiment, the scanning may take diagonal scanning, z-shaped scanning, Zig-zag scanning, horizontal scanning, vertical scanning, 4×4 sub-block scanning, or scanning in any one of other orders.

At operation 1102, values of the coefficients are entropy encoded based on the encoding mode shown in FIG. 10 and corresponding relationships shown in Table 1.

In an exemplary embodiment, the operation of entropy encoding the values of the coefficients based on the encoding mode shown in FIG. 10 and corresponding relationships shown in Table 1 includes the following operations. The values of respective coefficients in the coefficient block are entropy encoded according to a scanning position.

The non-zero flag sig of the coefficient is encoded. The non-zero flag sig is encoded as 0 when the absolute value of the coefficient is 0, and the non-zero flag sig is encoded as 1 when the absolute value of the coefficient is not 0.

When the non-zero flag sig is 0, encoding of the flag in which the absolute value of the coefficient is greater than 1, the modulo result flag, the remainder value and the sign flag of the coefficient are skipped; when the non-zero flag sig is 1, the flag gt1 in which the absolute value of the coefficient is greater than 1 is encoded. The flag gt1 in which the absolute value of the coefficient is greater than 1 is encoded as 0 when the absolute value of the coefficient is not greater than 1, and the flag gt1 in which the absolute value of the coefficient is greater than 1 is encoded as 1 when the absolute value of the coefficient is greater than 1.

When the flag gt1 in which the absolute value of the coefficient is greater than 1 is 0, encoding of the modulo result flag and the remainder value of the coefficient are skipped, and when the flag gt1 in which the absolute value of the coefficient is greater than 1 is 1, the modulo result flag rem_flag is encoded. The modulo result flag rem_flag is encoded as 11B when the absolute value of the coefficient is 2, the modulo result flag rem_flag is encoded as 11B when the absolute value of the coefficient is 2, the modulo result flag rem_flag is encoded as 00B when a result of the absolute value of the coefficient divided by 3 is 0, the modulo result flag rem_flag is encoded as 01B when a result of the absolute value of the coefficient divided by 3 is 1, and the modulo result flag rem_flag is encoded as 10B when a result of the absolute value of the coefficient divided by 3 is 2.

When the modulo result flag rem_flag is 11B, encoding of the remainder value of the coefficient is skipped; and when the modulo result flag rem_flag is not 11B, the remainder value rem of the coefficient is encoded.

The remainder value rem may be calculated according to the above formula 1 and Table 1.

When the non-zero flag sig is 1, the sign flag coeff_sign of the coefficient is encoded. The sign flag coeff_sign is encoded as 0 when the coefficient is positive, and the sign flag coeff_sign is encoded as 1 when the coefficient is negative.

In an example, when the coefficient is −3, an encoding result of the coefficient is: sig=1, gt1=1, rem_flag=00B, rem=0, and coeff_sign=1.

Figure 12:
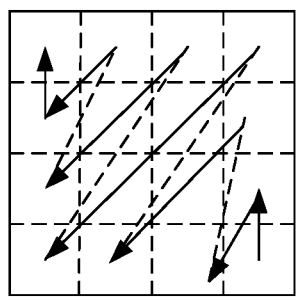
FIG. 12 is an exemplary diagram of a diagonal scanning according to an exemplary embodiment of the disclosure.
Figures 13, 14:
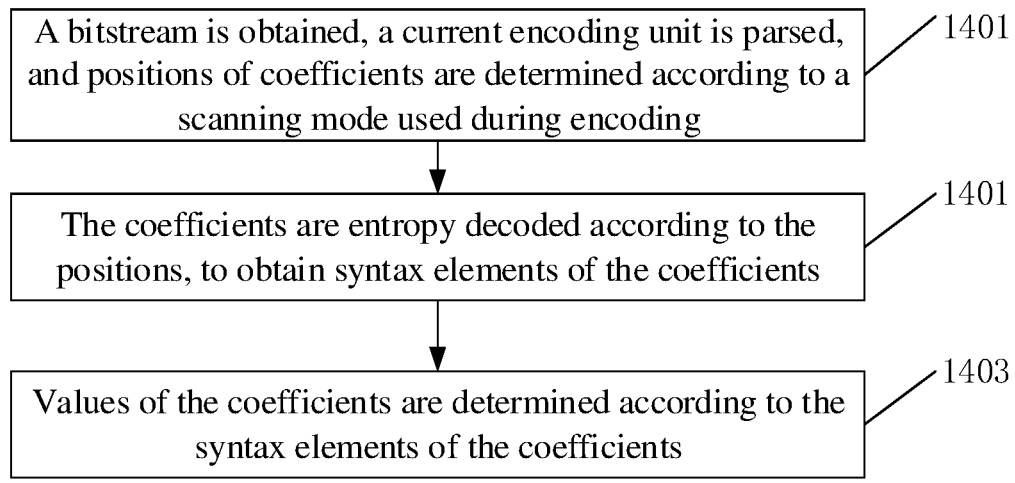
FIG. 13 is a schematic diagram of encoding of a scanned coefficient string according to an exemplary embodiment of the disclosure.
FIG. 14 is a schematic flowchart of a coefficient decoding method according to an exemplary embodiment of the disclosure.

In an example, assuming that a transform coefficient string obtained by quantizing a 4×4 transform block after residual transformation according to the diagonal scanning shown in FIG. 12 is {0, 2, 4, 5, 0, 6, 3, 7, 0, 2, 1, 0, 9, 3, 0, 8}, and each coefficient in the coefficient string is entropy encoded in sequence according to the encoding mode shown in FIG. 9 and corresponding relationships shown in Table 1, the encoded values are shown in FIG. 13.

At operation 1103, codewords generated by entropy encoding are written into a bitstream.

Based on the encoding mode shown in FIG. 10 and corresponding relationships shown in Table 1, the exemplary embodiment provides a coefficient entropy decoding method, as shown in FIG. 14, the method includes the following operations 1401 to 1403.

At operation 1401, a bitstream is obtained, a current encoding unit is parsed, and positions of coefficients are determined according to a scanning mode used during encoding.

In an exemplary embodiment, the scanning mode may take diagonal scanning, z-shaped scanning, Zig-zag scanning, horizontal scanning, vertical scanning, 4×4 sub-block scanning, or scanning in any one of other orders. For example, in the exemplary embodiment, the diagonal scanning is used during encoding, and the diagonal scanning is also used during decoding.

At operation 1402, the coefficients are entropy decoded according to the positions, to obtain syntax elements of the coefficients.

In an exemplary embodiment, a first coefficient in all the coefficients may be entropy decoded in sequence according to the positions, to obtain syntax elements of the coefficient, then a value of the coefficient is determined according to the syntax elements of the coefficient, and then a next coefficient may be entropy decoded.

In an exemplary embodiment, the operation of entropy decoding the coefficients according to the positions, to obtain syntax elements of the coefficients is implemented in a manner as follows.

The non-zero flag is decoded, and when the non-zero flag is decoded as 0, decoding of the flag in which the absolute value of the coefficient is greater than 1, the modulo result flag, the remainder value and the sign flag are skipped.

When the non-zero flag is decoded as 1, the flag in which the absolute value of the coefficient is greater than 1 is decoded, and when the flag in which the absolute value of the coefficient is greater than 1 is decoded as 0, decoding of the modulo result flag and the remainder value are skipped.

When the flag in which the absolute value of the coefficient is greater than 1 is decoded as 1, the modulo result flag is decoded. Decoding of the remainder value is skipped when the modulo result flag is decoded as 11B.

The remainder value is decoded when the modulo result flag is not decoded as 11B.

The sign flag is decoded when the non-zero flag is decoded as 1.

At operation 1403, values of the coefficients are determined according to the syntax elements of the coefficients.

In the exemplary embodiment, the operation of determining the values of the coefficients according to the syntax elements of the coefficients is implemented in a manner as follows.

A sum obtained by adding the decoded value of the non-zero flag, the decoded value of the flag in which the absolute value of the coefficient is greater than 1, a preset numerical value corresponding to the decoded value of the modulo result flag and the remainder value×3, is used as the absolute value of the coefficient; the value of the coefficient is positive when the sign flag is 0, and the value of the coefficient is negative when the sign flag is 1.

When any one of the following syntax elements is absent: the decoded value of the non-zero flag, the decoded value of the flag in which the absolute value of the coefficient is greater than 1, the decoded value of the modulo result flag and the remainder value, a decoded value of the absent syntax element or a corresponding preset numerical value takes a value of 0.

In the exemplary embodiment, the absolute value of the coefficient is calculated by the above formula 1.

In another exemplary embodiment, the operation of determining the values of the coefficients according to the syntax elements of the coefficients is implemented in any one of manners as follows.

When the non-zero flag is decoded as 0, it is determined that the value of the coefficient is 0.

When the non-zero flag is decoded as 1 and the flag in which the absolute value of the coefficient is greater than 1 is decoded as 0, it is determined that the absolute value of the coefficient is 1; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, and the modulo result flag is decoded as 11B, it is determined that the absolute value of the coefficient is 2; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, and the modulo result flag is not decoded as 11B, the absolute value of the coefficient is calculated according to the above formula 1; the value of the coefficient is positive when the sign flag is 0, and the value of the coefficient is negative when the sign flag is 1.

In an example, a decoding result of the coefficient is: when sig=1, gt1=1, rem_flag=00B, rem=0, and coeff_sign=1, the coefficient is −3.

The above encoding mode and corresponding relationships shown in FIG. 10 and Table 1 are exemplary descriptions, and other encoding modes and corresponding relationships may also be used. For example, the two-bit binary includes four types of binary encoding, any one binary encoding is used for the encoded value of the modulo result flag rem_flag of the coefficient whose absolute value is 2, and other three type of binary encoding are respectively used for encoded values of three modulo result flags rem_flag in which remainders of 0, 1, 2 are obtained by the absolute value of the coefficient divided by 3. The corresponding relationships between rem_flag and f(rem_flag) satisfy that the absolute value of the coefficient calculated according to formula 1 as an integer.

In an exemplary embodiment, the technical solution of the embodiment of the disclosure is described in detail by taking modulus of 3 as an example.

In the exemplary embodiment, the syntax elements of the coefficient include the non-zero flag sig, the flag gt1 in which the absolute value of the coefficient is greater than 1, the flag gt2 in which the absolute value of the coefficient is greater than 2, the modulo result flag rem_flag, the remainder value rem, and the sign flag coeff_sign. The modulo result flag rem_flag is represented by two-bit binary.

Figures 15, 16:
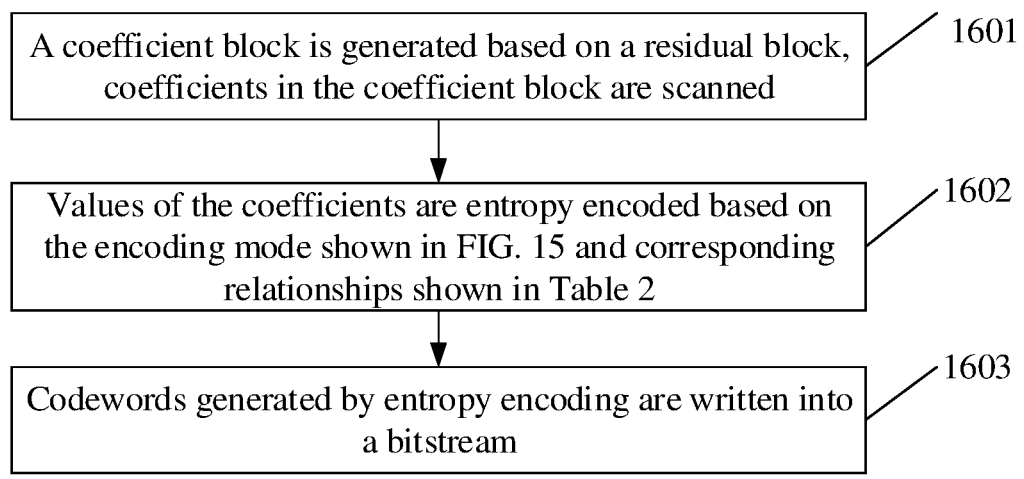
FIG. 15 is a schematic diagram of an encoding mode for an absolute value of a coefficient by taking a modulus of 3 according to an exemplary embodiment of the disclosure.
FIG. 16 is a schematic flowchart of a coefficient encoding method according to an exemplary embodiment of the disclosure.

In the exemplary embodiment, in case that the modulus of 3 is taken, a coefficient encoding mode is shown in FIG. 15, the values of respective flags satisfy formula 2: $|q_k|$=sig+ gt1+gt2+f(rem_flag)+3×rem. In formula 2, when any one of the non-zero flag sig, the flag gt1 in which the absolute value of the coefficient is greater than 1, the flag gt2 in which the absolute value of the coefficient is greater than 2, the modulo result flag rem_flag and the remainder value rem is absent, a value in the formula corresponding to the absent flag is processed as 0.

In the exemplary embodiment, rem_flag is a binary encoded value, f(rem_flag) is a numerical value corresponding to rem_flag and represented by decimalism, corresponding relationships between rem_flag and f(rem_flag) are as shown in Table 2.

TABLE 2

| rem_flag | 00 | 01 | 10 | 11 |
|---|---|---|---|---|
| f(rem_flag) | 0 | 1 | 2 | 3 |

In the exemplary embodiment, the encoded value of the modulo result flag rem_flag corresponding to the coefficient with the absolute value of 3 is preset to be 00B.

Based on the encoding mode shown in FIG. 15 and corresponding relationships shown in Table 2, the exemplary embodiment provides a coefficient entropy encoding method, as shown in FIG. 16, the method includes the following operations 1601 to 1603.

At operation 1601, a coefficient block is generated based on a residual block, coefficients in the coefficient block are scanned.

In an exemplary embodiment, a current block passes through a prediction part, that is, the current block is predicted by inter-prediction, or intra-prediction, or other modes, to obtain a prediction block; an image block at a position corresponding to coordinates of the prediction block or the like is taken from an original image, to obtain a difference between the image block and the prediction block so as to obtain a residual block of the current block. Then, the residual block is transformed or not transformed, to obtain a transform block containing a transformed coefficient or a coefficient block without transformation, which are collectively referred to as a coefficient block here. Then, the coefficient block is quantized, and quantized coefficients are entropy encoded according to a coefficient scanning order.

In an exemplary embodiment, the scanning may take diagonal scanning, z-shaped scanning, Zig-zag scanning, horizontal scanning, vertical scanning, 4×4 sub-block scanning, or scanning in any one of other orders.

At operation 1602, values of the coefficients are entropy encoded based on the encoding mode shown in FIG. 15 and corresponding relationships shown in Table 2.

In an exemplary embodiment, the operation of entropy encoding the values of the coefficients based on the encoding mode shown in FIG. 15 and corresponding relationships shown in Table 2 includes the following operations. The values of respective coefficients in the coefficient block are entropy encoded according to a scanning position.

The non-zero flag sig of the coefficient is encoded. The non-zero flag sig is encoded as 0 when the absolute value of the coefficient is 0, and the non-zero flag sig is encoded as 1 when the absolute value of the coefficient is not 0.

When the non-zero flag sig is 0, encoding of the flag in which the absolute value of the coefficient is greater than 1, the flag in which the absolute value of the coefficient is greater than 2, the modulo result flag, the remainder value and the sign flag of the coefficient are skipped; when the non-zero flag sig is 1, the flag gt1 in which the absolute value of the coefficient is greater than 1 is encoded. The flag gt1 in which the absolute value of the coefficient is greater than 1 is encoded as 0 when the absolute value of the coefficient is not greater than 1, and the flag gt1 in which the absolute value of the coefficient is greater than 1 is encoded as 1 when the absolute value of the coefficient is greater than 1.

When the flag gt1 in which the absolute value of the coefficient is greater than 1 is 0, encoding of the flag in which the absolute value of the coefficient is greater than 2, the modulo result flag and the remainder value of the coefficient are skipped, and when the flag gt1 in which the absolute value of the coefficient is greater than 1 is 1, the flag in which the absolute value of the coefficient is greater than 2 is encoded. The flag gt2 in which the absolute value of the coefficient is greater than 2 is encoded as 0 when the absolute value of the coefficient is not greater than 2, and the flag gt2 in which the absolute value of the coefficient is greater than 2 is encoded as 1 when the absolute value of the coefficient is greater than 2.

When the flag gt2 in which the absolute value of the coefficient is greater than 2 is 0, encoding of the modulo result flag and the remainder value of the coefficient are skipped, and when the flag gt2 in which the absolute value of the coefficient is greater than 2 is 1, the modulo result flag rem_flag is encoded. The modulo result flag rem_flag is encoded as 00B when the absolute value of the coefficient is 3, the modulo result flag rem_flag is encoded as 11B when a result of the absolute value of the coefficient divided by 3 is 0, the modulo result flag rem_flag is encoded as 01B when a result of the absolute value of the coefficient divided by 3 is 1, and the modulo result flag rem_flag is encoded as 10B when a result of the absolute value of the coefficient divided by 3 is 2.

When the modulo result flag rem_flag is 00B, encoding of the remainder value is skipped; and when the modulo result flag rem_flag is not 00B, the remainder value rem is encoded.

The remainder value rem may be calculated according to the above formula 2 and Table 2.

When the non-zero flag sig is 1, the sign flag coeff_sign is encoded. The sign flag coeff_sign is encoded as 0 when the coefficient is positive, and the sign flag coeff_sign is encoded as 1 when the coefficient is negative.

In an example, when the coefficient is −3, an encoding result is: sig=1, gt1=1, gt2=1, rem_flag=00B, coeff_sign=1.

At operation 1603, codewords generated by entropy encoding are written into a bitstream.

Based on the encoding mode shown in FIG. 15 and corresponding relationships shown in Table 2, the exemplary embodiment provides a coefficient entropy decoding method, as shown in FIG. 17, the method includes the following operations 1701 to 1703.

At operation 1701, a bitstream is obtained, a current encoding unit is parsed, and positions of coefficients are determined according to a scanning mode used during encoding.

In an exemplary embodiment, the scanning mode may take diagonal scanning, z-shaped scanning, Zig-zag scanning, horizontal scanning, vertical scanning, 4×4 sub-block scanning, or scanning in any one of other orders. For example, in the exemplary embodiment, the z-shaped scanning is used during encoding, and the z-shaped scanning is also used during decoding.

At operation 1702, the coefficients are entropy decoded according to the positions, to obtain syntax elements of the coefficients.

In an exemplary embodiment, a first coefficient in all the coefficients may be entropy decoded in sequence according to the positions, to obtain syntax elements of the coefficient, then a value of the coefficient is determined according to the syntax elements of the coefficient, and then a next coefficient may be entropy decoded.

In an exemplary embodiment, the operation of entropy decoding the coefficients according to the positions, to obtain syntax elements of the coefficients is implemented in a manner as follows.

The non-zero flag is decoded, and when the non-zero flag is decoded as 0, decoding of the flag in which the absolute value of the coefficient is greater than 1, the flag in which the absolute value of the coefficient is greater than 2, the modulo result flag, the remainder value and the sign flag are skipped.

When the non-zero flag is decoded as 1, the flag in which the absolute value of the coefficient is greater than 1 is decoded, and when the flag in which the absolute value of the coefficient is greater than 1 is decoded as 0, decoding of the flag in which the absolute value of the coefficient is greater than 2, the modulo result flag and the remainder value are skipped.

When the flag in which the absolute value of the coefficient is greater than 1 is decoded as 1, the flag in which the absolute value of the coefficient is greater than 2 is decoded. Decoding of the modulo result flag and the remainder value are skipped when the flag in which the absolute value of the coefficient is greater than 2 is decoded as 0.

When the flag in which the absolute value of the coefficient is greater than 2 is decoded as 1, the modulo result flag is decoded. Decoding of the remainder value is skipped when the modulo result flag is decoded as 00B.

Decoding of the remainder value is continued when the modulo result flag is not decoded as 00B.

The sign flag is decoded when the non-zero flag is decoded as 1.

At operation 1703, values of the coefficients are determined according to the syntax elements of the coefficients.

In the exemplary embodiment, the operation of determining the values of the coefficients according to the syntax elements of the coefficients is implemented in a manner as follows.

A sum obtained by adding the decoded value of the non-zero flag, the decoded value of the flag in which the absolute value of the coefficient is greater than 1, the decoded value of the flag in which the absolute value of the coefficient is greater than 2, a preset numerical value corresponding to the decoded value of the modulo result flag and the remainder value×3, is used as the absolute value of the coefficient; the value of the coefficient is positive when the sign flag is 0, and the value of the coefficient is negative when the sign flag is 1.

When any one of the following syntax elements is absent: the decoded value of the non-zero flag, the decoded value of the flag in which the absolute value of the coefficient is greater than 1, the decoded value of the flag in which the absolute value of the coefficient is greater than 2, the decoded value of the modulo result flag and the remainder value, a decoded value of the absent syntax element or a corresponding preset numerical value takes a value of 0.

In the exemplary embodiment, the absolute value of the coefficient is calculated by the above formula 2.

In another exemplary embodiment, the operation of determining the values of the coefficients according to the syntax elements of the coefficients is implemented in any one of manners as follows.

When the non-zero flag is decoded as 0, it is determined that the value of the coefficient is 0.

When the non-zero flag is decoded as 1 and the flag in which the absolute value of the coefficient is greater than 1 is decoded as 0, it is determined that the absolute value of the coefficient is 1; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, and the flag in which the absolute value of the coefficient is greater than 2 is decoded as 0, it is determined that the absolute value of the coefficient is 2; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, the flag in which the absolute value of the coefficient is greater than 2 is decoded as 1, and the modulo result flag is decoded as 00B, it is determined that the absolute value of the coefficient is 3; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, the flag in which the absolute value of the coefficient is greater than 2 is decoded as 1, and the modulo result flag is not decoded as 00B, the absolute value of the coefficient is calculated according to the above formula 2; the value of the coefficient is positive when the sign flag is 0, and the value of the coefficient is negative when the sign flag is 1.

In an example, a decoding result of the coefficient is: when sig=1, gt1=1, rem_flag=00B, and coeff_sign=1, the coefficient is −3.

The above encoding mode and corresponding relationships shown in FIG. 15 and Table 2 are exemplary descriptions, and other encoding modes and corresponding relationships may also be used. For example, the two-bit binary includes four types of binary encoding, any one binary encoding is used as the encoded value of the modulo result flag rem_flag of the coefficient whose absolute value is 3, and other three types of binary encoding are respectively used as encoded values of three modulo result flags rem_flag in which remainders of 0, 1, 2 are obtained by the absolute value of the coefficient divided by 3. The corresponding relationships between rem_flag and f(rem_flag) satisfy that the absolute value of the coefficient calculated according to formula 2 as an integer.

In an exemplary embodiment, the technical solution of the embodiment of the disclosure is described in detail by taking modulus of 5 as an example.

In the exemplary embodiment, the syntax elements of the coefficient include the non-zero flag sig, the flag gt1 in which the absolute value of the coefficient is greater than 1, the modulo result flag rem_flag, the remainder value rem, and the sign flag coeff_sign. The modulo result flag rem_flag is represented by three-bit binary.

In the exemplary embodiment, in case that the modulus of 5 is taken, a coefficient encoding mode is shown in FIG. 18, the values of respective flags satisfy formula 3: $|q_k|$=sig+gt1+f(rem_flag)+5×rem. In formula 3, when any one of the non-zero flag sig, the flag gt1 in which the absolute value of the coefficient is greater than 1, the modulo result flag rem_flag and the remainder value rem is absent, a value in the formula corresponding to the absent flag is processed 0.

In the exemplary embodiment, rem_flag is a binary encoded value, f(rem_flag) is a numerical value corresponding to rem_flag and represented by decimalism, corresponding relationships between rem_flag and f(rem_flag) are as shown in Table 3.

TABLE 3

| rem_flag | 010 | 011 | 100 | 000 | 001 | 101 | 110 | 111 |
|---|---|---|---|---|---|---|---|---|
| f(rem_flag) | 0 | 1 | 2 | 3 | 4 | 0 | 1 | 2 |

In the exemplary embodiment, the encoded value of the modulo result flag rem_flag corresponding to the coefficient with the absolute value of 2 is preset to be 101B, the encoded value of the modulo result flag rem_flag corresponding to the coefficient with the absolute value of 3 is preset to be 110B, and the encoded value of the modulo result flag rem_flag corresponding to the coefficient with the absolute value of 4 is preset to be 11B.

Figure 19:
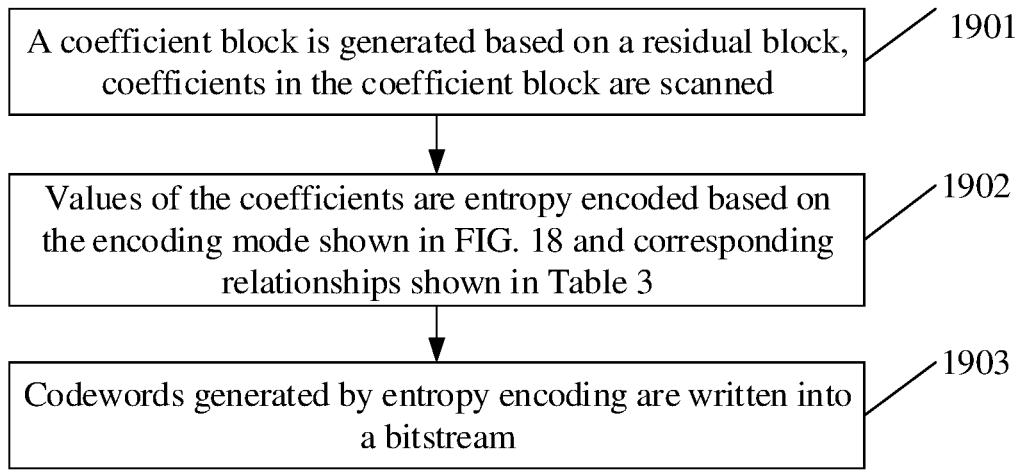
FIG. 19 is a schematic flowchart of a coefficient encoding method according to an exemplary embodiment of the disclosure.

Based on the encoding mode shown in FIG. 18 and corresponding relationships shown in Table 3, the exemplary embodiment provides a coefficient entropy encoding method, as shown in FIG. 19, the method includes the following operations 1901 to 1903.

At operation 1901, a coefficient block is generated based on a residual block, coefficients in the coefficient block are scanned.

In an exemplary embodiment, a current block passes through a prediction part, that is, the current block is predicted by inter-prediction, or intra-prediction, or other modes, to obtain a prediction block; an image block at a position corresponding to coordinates of the prediction block or the like is taken from an original image, to obtain a difference between the image block and the prediction block so as to obtain a residual block of the current block. Then, the residual block is transformed or not transformed, to obtain a transform block containing a transformed coefficient or a coefficient block without transformation, which are collectively referred to as a coefficient block here. Then, the coefficient block is quantized, and quantized coefficients are entropy encoded according to a coefficient scanning order.

In an exemplary embodiment, the scanning may take diagonal scanning, z-shaped scanning, Zig-zag scanning, horizontal scanning, vertical scanning, 4×4 sub-block scanning, or scanning in any one of other orders.

At operation 1902, values of the coefficients are entropy encoded based on the encoding mode shown in FIG. 18 and corresponding relationships shown in Table 3.

In an exemplary embodiment, the operation of entropy encoding the values of the coefficients based on the encoding mode shown in FIG. 18 and corresponding relationships shown in Table 3 includes the following operations. The values of respective coefficients in the coefficient block are entropy encoded according to a scanning position.

The non-zero flag sig of the coefficient is encoded. The non-zero flag sig is encoded as 0 when the absolute value of the coefficient is 0, and the non-zero flag sig is encoded as 1 when the absolute value of the coefficient is not 0.

When the non-zero flag sig is 0, encoding of the flag in which the absolute value of the coefficient is greater than 1, the modulo result flag, the remainder value and the sign flag of the coefficient are skipped; when the non-zero flag sig is 1, the flag gt1 in which the absolute value of the coefficient is greater than 1 is encoded. The flag gt1 in which the absolute value of the coefficient is greater than 1 is encoded as 0 when the absolute value of the coefficient is not greater than 1, and the flag gt1 in which the absolute value of the coefficient is greater than 1 is encoded as 1 when the absolute value of the coefficient is greater than 1.

When the flag gt1 in which the absolute value of the coefficient is greater than 1 is 0, encoding of the modulo result flag and the remainder value of the coefficient are skipped, and when the flag gt1 in which the absolute value of the coefficient is greater than 1 is 1, the modulo result flag of the coefficient is encoded. The modulo result flag rem_flag is encoded as 101B when modulus of the absolute value of the coefficient is 2, the modulo result flag rem_flag is encoded as 110B when modulus of the absolute value of the coefficient is 3, the modulo result flag rem_flag is encoded as 111B when modulus of the absolute value of the coefficient is 4, the modulo result flag rem_flag is encoded as 000B when a result of the absolute value of the coefficient divided by 5 is 0, the modulo result flag rem_flag is encoded as 001B when a result of the absolute value of the coefficient divided by 5 is 1, the modulo result flag rem_flag is encoded as 010B when a result of the absolute value of the coefficient divided by 5 is 2, the modulo result flag rem_flag is encoded as 011B when a result of the absolute value of the coefficient divided by 5 is 3, and the modulo result flag rem_flag is encoded as 100 B when a result of the absolute value of the coefficient divided by 5 is 4.

When the modulo result flag rem_flag is encoded as 101B, 110B or 111B, encoding of the remainder value is skipped.

When the modulo result flag rem_flag is not encoded as 101B, 110B or 111B, the remainder value is encoded.

The remainder value rem may be calculated according to the above formula 3 and Table 3.

When the non-zero flag sig is 1, the sign flag coeff_sign is encoded. The sign flag coeff_sign is encoded as 0 when the coefficient is positive, and the sign flag coeff_sign is encoded as 1 when the coefficient is negative.

In an example, when the coefficient is −3, an encoding result is: sig=1, gt1=1, rem_flag=110B, coeff_sign=1.

At operation 1903, codewords generated by entropy encoding are written into a bitstream.

Figure 20:
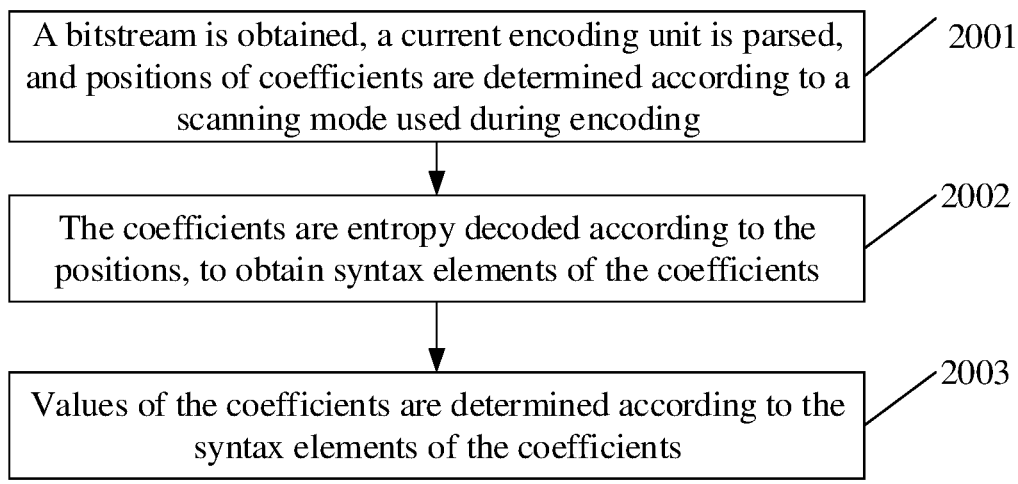
FIG. 20 is a schematic flowchart of a coefficient decoding method according to an exemplary embodiment of the disclosure.

Based on the encoding mode shown in FIG. 18 and corresponding relationships shown in Table 3, the exemplary embodiment provides a coefficient entropy decoding method, as shown in FIG. 20, the method includes the following operations 2001 to 2003.

At operation 2001, a bitstream is obtained, a current encoding unit is parsed, and positions of coefficients are determined according to a scanning mode used during encoding.

In an exemplary embodiment, the scanning mode may take diagonal scanning, z-shaped scanning, Zig-zag scanning, horizontal scanning, vertical scanning, 4×4 sub-block scanning, or scanning in any one of other orders. For example, in the exemplary embodiment, the horizontal scanning is used during encoding, and the horizontal scanning is also used during decoding.

At operation 2002, the coefficients are entropy decoded according to the positions, to obtain syntax elements of the coefficients.

In an exemplary embodiment, a first coefficient in all the coefficients may be entropy decoded in sequence according to the positions, to obtain syntax elements of the coefficient, then a value of the coefficient is determined according to the syntax elements of the coefficient, and then a next coefficient may be entropy decoded.

In an exemplary embodiment, the operation of entropy decoding the coefficients according to the positions, to obtain syntax elements of the coefficients is implemented in a manner as follows.

The non-zero flag is decoded, and when the non-zero flag is decoded as 0, decoding of the flag in which the absolute value of the coefficient is greater than 1, the modulo result flag, the remainder value and the sign flag are skipped.

When the non-zero flag is decoded as 1, the flag in which the absolute value of the coefficient is greater than 1 is decoded, and when the flag in which the absolute value of the coefficient is greater than 1 is decoded as 0, decoding of the modulo result flag and the remainder value are skipped.

When the flag in which the absolute value of the coefficient is greater than 1 is decoded as 1, the modulo result flag is decoded. Decoding of the remainder value is skipped when the modulo result flag is decoded as 101B, 110B or 111B.

The remainder value is decoded when the modulo result flag is not decoded as 101B, 110B or 111B.

The sign flag is decoded when the non-zero flag is decoded as 1.

At operation 2003, values of the coefficients are determined according to the syntax elements of the coefficients.

In the exemplary embodiment, the operation of determining the values of the coefficients according to the syntax elements of the coefficients is implemented in a manner as follows.

A sum obtained by adding the decoded value of the non-zero flag, the decoded value of the flag in which the absolute value of the coefficient is greater than 1, a preset numerical value corresponding to the decoded value of the modulo result flag and the remainder value×5, is used as the absolute value of the coefficient; the value of the coefficient is positive when the sign flag is 0, and the value of the coefficient is negative when the sign flag is 1.

When any one of the following syntax elements is absent: the decoded value of the non-zero flag, decoded values corresponding to flags in which the absolute value of the coefficient is greater than 1 respectively, the decoded value of the modulo result flag and the remainder value, a decoded value of the absent syntax element or a corresponding preset numerical value takes a value of 0.

In the exemplary embodiment, the absolute value of the coefficient is calculated by the above formula 3.

In another exemplary embodiment, the operation of determining the values of the coefficients according to the syntax elements of the coefficients is implemented in any one of manners as follows.

When the non-zero flag is decoded as 0, it is determined that the value of the coefficient is 0.

When the non-zero flag is decoded as 1 and the flag in which the absolute value of the coefficient is greater than 1 is decoded as 0, it is determined that the absolute value of the coefficient is 1; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, and the modulo result flag is decoded as 101B, it is determined that the absolute value of the coefficient is 2; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, and the modulo result flag is decoded as 110B, it is determined that the absolute value of the coefficient is 3; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, and the modulo result flag is decoded as 111B, it is determined that the absolute value of the coefficient is 4; the value of the coefficient is positive when the sign flag is 0, and the value of the coefficient is negative when the sign flag is 1.

When the non-zero flag is decoded as 1, the flag in which the absolute value of the coefficient is greater than 1 is decoded as 1, and the modulo result flag is not decoded as 101B, 110B or 111B, the absolute value of the coefficient is calculated according to the above formula 3 and Table 3; the value of the coefficient is positive when the sign flag is 0, and the value of the coefficient is negative when the sign flag is 1.

In an example, a decoding result of the coefficient is: when sig=1, gt1=1, rem_flag=000B, rem=0, and coeff_sign=1, the coefficient is −5.

The above encoding mode and corresponding relationships shown in FIG. 18 and Table 3 are exemplary descriptions, and other encoding modes and corresponding relationships may also be used. For example, the three-bit binary includes eight types of binary encoding, any three types of the binary encoding are respectively used as encoded values of modulo result flags rem_flag of the coefficient whose absolute value is 2, 3, 4, and other five types of binary encoding are respectively used as encoded values of five modulo result flags rem_flag in which remainders of 0, 1, 2, 3, 4 are obtained by the absolute value of the coefficient divided by 5. The corresponding relationships between rem_flag and f(rem_flag) satisfy that the absolute value of the coefficient calculated according to formula 3 as an integer.

In an exemplary embodiment, the technical solution of the embodiment of the disclosure is described in detail by taking modulus of 4 as an example.

In the exemplary embodiment, the syntax elements of the coefficient include the non-zero flag sig, the flag gt1 in which the absolute value of the coefficient is greater than 1, the modulo result flag rem_flag, the remainder value rem, and the sign flag coeff_sign. The modulo result flag rem_flag is represented by two-bit binary.

Figures 21, 22:
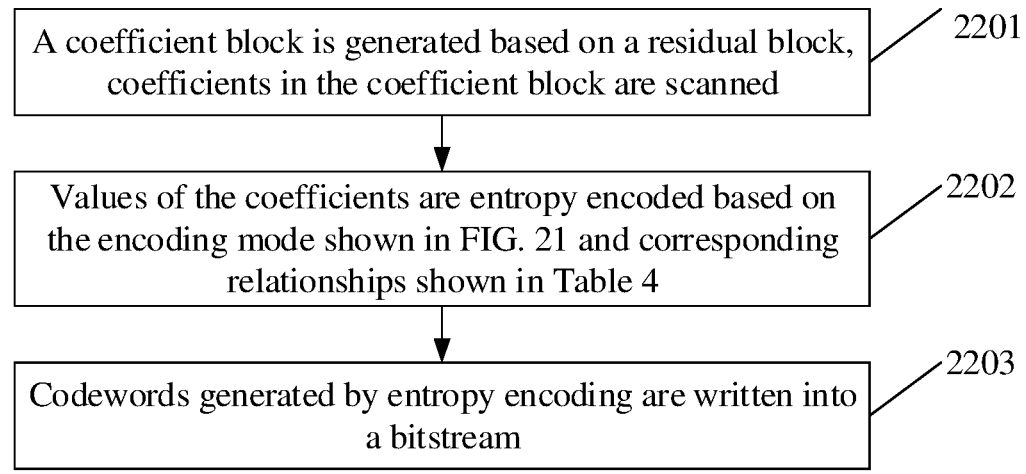
FIG. 21 is a schematic diagram of an encoding mode for an absolute value of a coefficient by taking a modulus of 4 according to an exemplary embodiment of the disclosure.
FIG. 22 is a schematic flowchart of a coefficient encoding method according to an exemplary embodiment of the disclosure.

In the exemplary embodiment, in case that the modulus of 4 is taken, a coefficient encoding mode is shown in FIG. 21, the values of respective flags satisfy formula 4: $|q_k|$=sig+gt1+g (rem_flag)+4×rem. When any one of the non-zero flag sig, the flag gt1 in which the absolute value of the coefficient is greater than 1, the modulo result flag rem_flag and the remainder value rem is absent, a value in the formula corresponding to the absent flag is processed as 0.

In the exemplary embodiment, rem_flag is a corresponding binary encoded value, f(rem_flag) is a numerical value corresponding to rem_flag and represented by decimalism, corresponding relationships between rem_flag and f(rem_flag) are as shown in Table 4.

TABLE 4

| rem_flag | 00 | 01 | 10 | 11 |
|---|---|---|---|---|
| f(rem_flag) | 0 | 1 | 2 | 3 |

Based on the encoding mode shown in FIG. 21 and corresponding relationships shown in Table 4, the exemplary embodiment provides a coefficient entropy encoding method, as shown in FIG. 22, the method includes the following operations 2201 to 2203.

At operation 2201, a coefficient block is generated based on a residual block, coefficients in the coefficient block are scanned.

In an exemplary embodiment, a current block passes through a prediction part, that is, the current block is predicted by inter-prediction, or intra-prediction, or other modes, to obtain a prediction block; an image block at a position corresponding to coordinate of the prediction block or the like is taken from an original image, to obtain a difference between the image block and the prediction block so as to obtain a residual block of the current block. Then, the residual block is transformed or not transformed, to obtain a transform block containing a transformed coefficient or a coefficient block without transformation, which are collectively referred to as a coefficient block here. Then, the coefficient block is quantized, and quantized coefficients are entropy encoded according to a coefficient scanning order.

In an exemplary embodiment, the scanning may take diagonal scanning, z-shaped scanning, Zig-zag scanning, horizontal scanning, vertical scanning, 4×4 sub-block scanning, or scanning in any one of other orders.

At operation 2202, values of the coefficients are entropy encoded based on the encoding mode shown in FIG. 21 and corresponding relationships shown in Table 4.

In an exemplary embodiment, the operation of entropy encoding the values of the coefficients based on the encoding mode shown in FIG. 21 and corresponding relationships shown in Table 4 includes the following operations. The values of respective coefficients in the coefficient block are entropy encoded according to a scanning position.

The non-zero flag sig of the coefficient is encoded. The non-zero flag sig is encoded as 0 when the absolute value of the coefficient is 0, and the non-zero flag sig is encoded as 1 when the absolute value of the coefficient is not 0.

When the non-zero flag sig is 0, encoding of the flag in which the absolute value of the coefficient is greater than 1, the modulo result flag, the remainder value and the sign flag of the coefficient are skipped; when the non-zero flag sig is 1, the flag gt1 in which the absolute value of the coefficient is greater than 1 is encoded. The flag gt1 in which the absolute value of the coefficient is greater than 1 is encoded as 0 when the absolute value of the coefficient is not greater than 1, and the flag gt1 in which the absolute value of the coefficient is greater than 1 is encoded as 1 when the absolute value of the coefficient is greater than 1.

When the flag gt1 in which the absolute value of the coefficient is greater than 1 is 0, encoding of the modulo result flag and the remainder value of the coefficient are skipped, and when the flag gt1 in which the absolute value of the coefficient is greater than 1 is 1, the modulo result flag of the coefficient is encoded. The modulo result flag rem_flag is encoded as 00B when a result of the absolute value of the coefficient divided by 4 is 0, the modulo result flag rem_flag is encoded as 01B when a result of the absolute value of the coefficient divided by 4 is 1, the modulo result flag rem_flag is encoded as when a result of the absolute value of the coefficient divided by 4 is 2, and the modulo result flag rem_flag is encoded as 11B when a result of the absolute value of the coefficient divided by 4 is 3.

The remainder value is encoded.

The remainder value rem may be calculated according to the above formula 4 and Table 4.

When the non-zero flag sig is 1, the sign flag coeff_sign is encoded. The sign flag coeff_sign is encoded as 0 when the coefficient is positive, and the sign flag coeff_sign is encoded as 1 when the coefficient is negative.

In an example, when the coefficient is −3, an encoding result is: sig=1, gt1=1, rem_flag=01B, rem=0, coeff_sign=1.

At operation 2203, codewords generated by entropy encoding are written into a bitstream.

Figure 23:
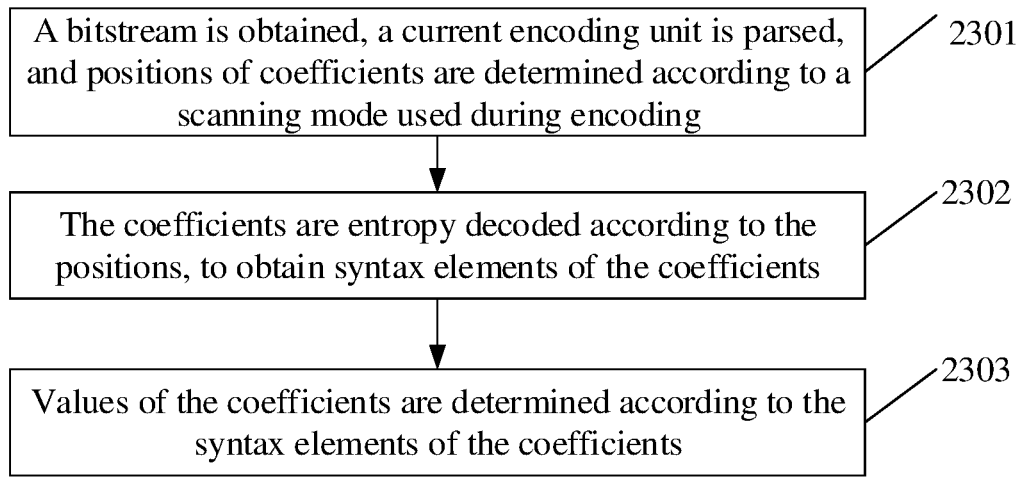
FIG. 23 is a schematic flowchart of a coefficient decoding method according to an exemplary embodiment of the disclosure.

Based on the encoding mode shown in FIG. 21 and corresponding relationships shown in Table 4, the exemplary embodiment provides a coefficient entropy decoding method, as shown in FIG. 23, the method includes the following operations 2301 to 2303.

At operation 2301, a bitstream is obtained, a current encoding unit is parsed, and positions of coefficients are determined according to a scanning mode used during encoding.

In an exemplary embodiment, the scanning mode may take diagonal scanning, z-shaped scanning, Zig-zag scanning, horizontal scanning, vertical scanning, 4×4 sub-block scanning, or scanning in any one of other orders. For example, in the exemplary embodiment, the vertical scanning is used during encoding, and the vertical scanning is also used during decoding.

At operation 2302, the coefficients are entropy decoded according to the positions, to obtain syntax elements of the coefficients.

In an exemplary embodiment, a first coefficient in all the coefficients may be entropy decoded in sequence according to the positions, to obtain syntax elements of the coefficient, then a value of the coefficient is determined according to the syntax elements of the coefficient, and then a next coefficient may be entropy decoded.

In an exemplary embodiment, the operation of entropy decoding the coefficients according to the positions, to obtain syntax elements of the coefficients is implemented in a manner as follows.

The non-zero flag is decoded, and when the non-zero flag is decoded as 0, decoding of the flag in which the absolute value of the coefficient is greater than 1, the modulo result flag, the remainder value and the sign flag are skipped.

When the non-zero flag is decoded as 1, the flag in which the absolute value of the coefficient is greater than 1 is decoded, and when the flag in which the absolute value of the coefficient is greater than 1 is decoded as 0, decoding of the modulo result flag and the remainder value are skipped.

When the flag in which the absolute value of the coefficient is greater than 1 is decoded as 1, decoding of the modulo result flag and the remainder value are continued.

The sign flag is decoded when the non-zero flag is decoded as 1.

At operation 2303, values of the coefficients are determined according to the syntax elements of the coefficients.

In the exemplary embodiment, the operation of determining the values of the coefficients according to the syntax elements of the coefficients is implemented in a manner as follows.

A sum obtained by adding the decoded value of the non-zero flag, the decoded value of the flag in which the absolute value of the coefficient is greater than 1, a preset numerical value corresponding to the decoded value of the modulo result flag and the remainder value×4, is used as the absolute value of the coefficient; the value of the coefficient is positive when the sign flag is 0, and the value of the coefficient is negative when the sign flag is 1.

When any one of the following syntax elements is absent: the decoded value of the non-zero flag, decoded values corresponding to flags in which the absolute value of the coefficient is greater than 1 respectively, the decoded value of the modulo result flag and the remainder value, a decoded value of the absent syntax element or a corresponding preset numerical value takes a value of 0.

In the exemplary embodiment, the absolute value of the coefficient is calculated by the above formula 4.

In another exemplary embodiment, the operation of determining the values of the coefficients according to the syntax elements of the coefficients is implemented in any one of manners as follows.

When the non-zero flag is decoded as 0, it is determined that the value of the coefficient is 0.

When the non-zero flag is decoded as 1 and the flag in which the absolute value of the coefficient is greater than 1 is decoded as 0, it is determined that the absolute value of the coefficient is 1; the value of the coefficient is positive when the sign flag is 0, and the value of the coefficient is negative when the sign flag is 1.

When the non-zero flag is decoded as 1 and the flag in which the absolute value of the coefficient is greater than 1 is decoded as 1, the absolute value of the coefficient is calculated according to the above formula 4 and Table 4; the value of the coefficient is positive when the sign flag is 0, and the value of the coefficient is negative when the sign flag is 1.

In an example, a decoding result of the coefficient is: when sig=1, gt1=1, rem_flag=10B, rem=1, and coeff_sign=1, the coefficient is −8.

The above encoding mode and corresponding relationships shown in FIG. 21 and Table 4 are exemplary descriptions, and other encoding modes and corresponding relationships may also be used. For example, the two-bit binary includes four types of binary encoding, the four types of binary encoding are respectively used as encoded values of four modulo result flags rem_flag in which remainders of 0, 1, 2, 3 are obtained by the absolute value of the coefficient divided by 4. The corresponding relationships between rem_flag and f(rem_flag) satisfy that the absolute value of the coefficient calculated according to formula 4 as an integer.

In another exemplary embodiment, the technical solution of the embodiment of the disclosure is described in detail by taking modulus of 4 as an example. The exemplary embodiment differs from the previous exemplary embodiment in that the values of respective flags satisfy formula 5: $|q_k|=$sig+gt1+rem_flag+4×rem.

Figure 24:
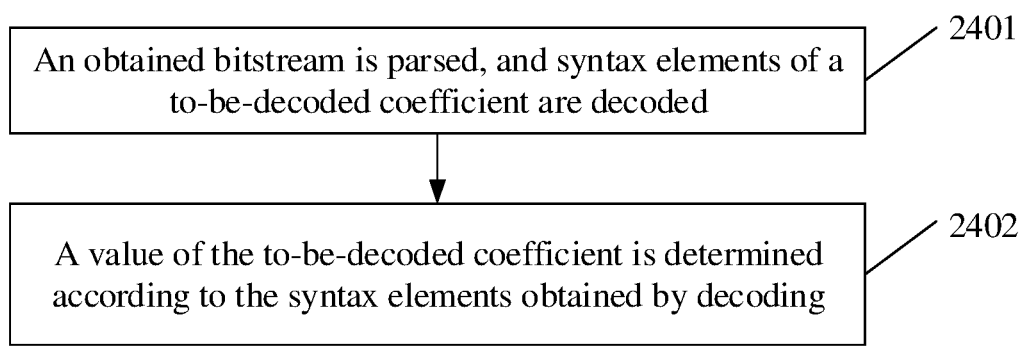
FIG. 24 is a schematic flowchart of a coefficient decoding method according to an embodiment of the disclosure.

An embodiment of the disclosure provides a coefficient decoding method, as shown in FIG. 24, the method includes the following operations 2401 and 2402.

At operation 2401, an obtained bitstream is parsed, and syntax elements of a to-be-decoded coefficient are decoded.

At operation 2402, a value of the to-be-decoded coefficient is determined according to the syntax elements obtained by decoding.

The syntax elements include: a non-zero flag, a flag in which an absolute value is greater than 1, a modulo result flag, a remainder value, and a sign flag; an absolute value of the to-be-decoded coefficient is a sum obtained by adding a sum of an encoded value of the non-zero flag, an encoded value of the flag in which the absolute value is greater than 1, and a preset numerical value corresponding to an encoded value of the modulo result flag, to a product of an encoded value of the remainder value and N. The value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, and N=2, 3, 4 or 5.

In an exemplary embodiment, N=3.

A corresponding preset numerical value is 0 when the modulo result flag is decoded as 11B.

The corresponding preset numerical value is 1 when the modulo result flag is decoded as 00B.

The corresponding preset numerical value is 2 when the modulo result flag is decoded as 01B.

The corresponding preset numerical value is 3 when the modulo result flag is decoded as 10B.

In an exemplary embodiment, N=4.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

Figure 25:
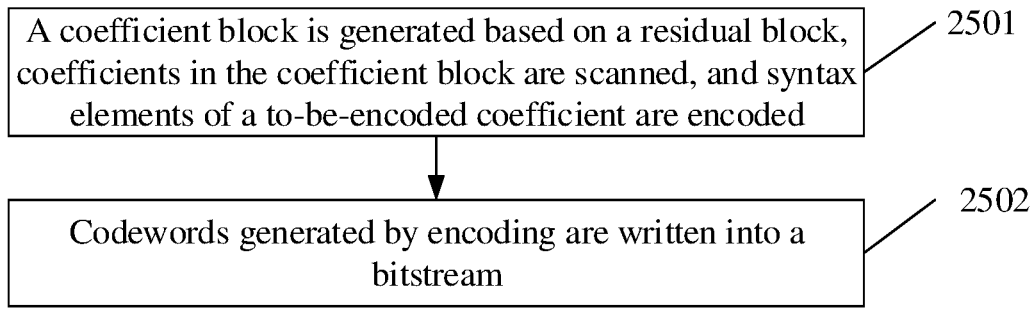
FIG. 25 is a schematic flowchart of a coefficient encoding method according to an embodiment of the disclosure.

An embodiment of the disclosure provides a coefficient encoding method, as shown in FIG. 25, the method includes the following operations 2501 and 2502.

At operation 2501, a coefficient block is generated based on a residual block, coefficients in the coefficient block are scanned, and syntax elements of a to-be-encoded coefficient are encoded.

At operation 2502, codewords generated by encoding are written into a bitstream.

The syntax elements include: a non-zero flag, a flag in which an absolute value is greater than 1, a modulo result flag, a remainder value, and a sign flag; an absolute value of the to-be-decoded coefficient is a sum obtained by adding a sum of an encoded value of the non-zero flag, an encoded value of the flag in which the absolute value is greater than 1, and a preset numerical value corresponding to an encoded value of the modulo result flag, to a product of an encoded value of the remainder value and N. A value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, and N=2, 3, 4 or 5.

In an exemplary embodiment, N=3.

The modulo result flag is encoded as 11B when the absolute value of the coefficient is 2.

The modulo result flag of a coefficient in which a remainder of 0 is obtained by an absolute value of the coefficient divided by 3 is encoded as 00B.

The modulo result flag of a coefficient in which a remainder of 1 is obtained by an absolute value of the coefficient divided by 3 is encoded as 01B.

The modulo result flag of a coefficient in which a remainder of 2 is obtained by an absolute value of the coefficient divided by 3 is encoded as 10B.

A corresponding preset numerical value is 0 when the modulo result flag is encoded as 11B.

The corresponding preset numerical value is 1 when the modulo result flag is encoded as 00B.

The corresponding preset numerical value is 2 when the modulo result flag is encoded as 01B.

The corresponding preset numerical value is 3 when the modulo result flag is encoded as 10B.

In an exemplary embodiment, N=3.

The modulo result flag is encoded as 00B when the absolute value of the coefficient is 3.

The modulo result flag of a coefficient in which a remainder of 0 is obtained by an absolute value of the coefficient divided by 3 is encoded as 11B.

The modulo result flag of a coefficient in which a remainder of 1 is obtained by an absolute value of the coefficient divided by 3 is encoded as 01B.

The modulo result flag of a coefficient in which a remainder of 2 is obtained by an absolute value of the coefficient divided by 3 is encoded as 10B.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

Figure 26:
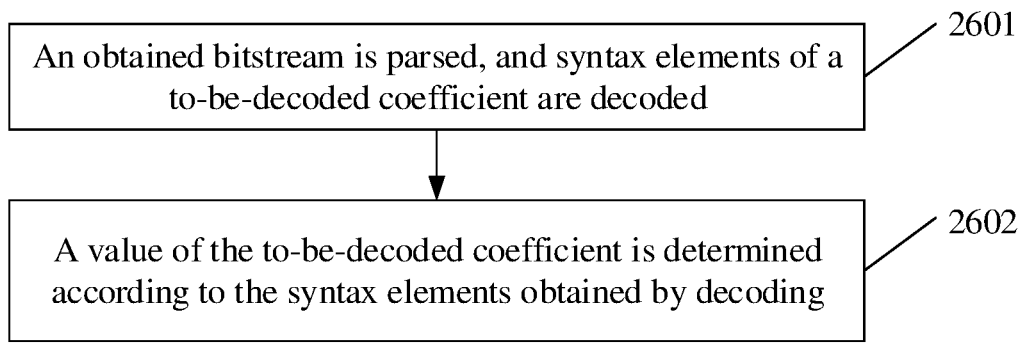
FIG. 26 is a schematic flowchart of a coefficient decoding method according to an embodiment of the disclosure.

An embodiment of the disclosure provides a coefficient decoding method, as shown in FIG. 26, the method includes the following operations 2601 and 2602.

At operation 2601, an obtained bitstream is parsed, and syntax elements of a to-be-decoded coefficient are decoded.

At operation 2602, a value of the to-be-decoded coefficient is determined according to the syntax elements obtained by decoding.

The syntax elements include: a non-zero flag, a flag in which an absolute value is greater than 1, a flag in which the absolute value is greater than 2, a modulo result flag, a remainder value, and a sign flag; an absolute value of the to-be-decoded coefficient is a sum obtained by adding a sum of an encoded value of the non-zero flag, an encoded value of the flag in which the absolute value is greater than 1, an encoded value of the flag in which the absolute value is greater than 2, and a preset numerical value corresponding to an encoded value of the modulo result flag, to a product of an encoded value of the remainder value and N. The value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, and N=2, 3, 4 or 5.

In an exemplary embodiment, N=4.

The modulo result flag of a coefficient in which a remainder of 0 is obtained by an absolute value of the coefficient divided by 4 is encoded as 10B.

The modulo result flag of a coefficient in which a remainder of 1 is obtained by an absolute value of the coefficient divided by 4 is encoded as 11B.

The modulo result flag of a coefficient in which a remainder of 2 is obtained by an absolute value of the coefficient divided by 4 is encoded as 00B.

The modulo result flag of a coefficient in which a remainder of 3 is obtained by an absolute value of the coefficient divided by 4 is encoded as 01B.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

Figure 27:
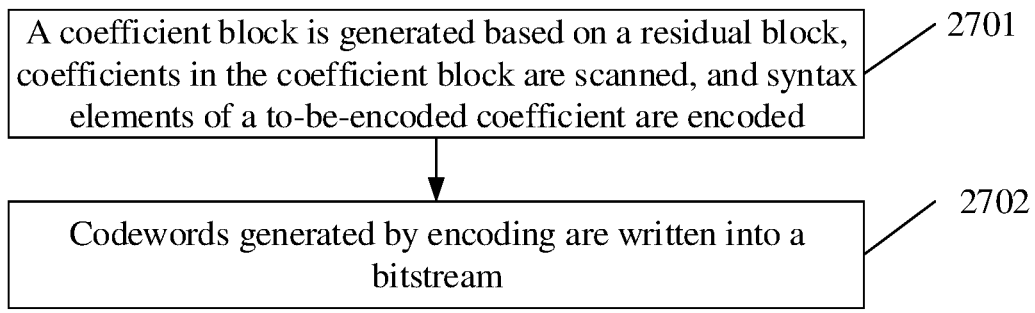
FIG. 27 is a schematic flowchart of a coefficient encoding method according to an embodiment of the disclosure.

An embodiment of the disclosure provides a coefficient encoding method, as shown in FIG. 27, the method includes the following operations 2701 and 2702.

At operation 2701, a coefficient block is generated based on a residual block, coefficients in the coefficient block are scanned, and syntax elements of a to-be-encoded coefficient are encoded.

At operation 2702, codewords generated by encoding are written into a bitstream.

The syntax elements include: a non-zero flag, a flag in which an absolute value is greater than 1, a flag in which the absolute value is greater than 2, a modulo result flag, a remainder value, and a sign flag; an absolute value of the to-be-decoded coefficient is a sum obtained by adding a sum of an encoded value of the non-zero flag, an encoded value of the flag in which the absolute value is greater than 1, an encoded value of the flag in which the absolute value is greater than 2, and a preset numerical value corresponding to an encoded value of the modulo result flag, to a product of an encoded value of the remainder value and N. A value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, and N=2, 3, 4 or 5.

In an exemplary embodiment, N=4.

The modulo result flag of a coefficient in which a remainder of 0 is obtained by an absolute value of the coefficient divided by 4 is encoded as 10B.

The modulo result flag of a coefficient in which a remainder of 1 is obtained by an absolute value of the coefficient divided by 4 is encoded as 11B.

The modulo result flag of a coefficient in which a remainder of 2 is obtained by an absolute value of the coefficient divided by 4 is encoded as 00B.

The modulo result flag of a coefficient in which a remainder of 3 is obtained by an absolute value of the coefficient divided by 4 is encoded as 01B.

A corresponding preset numerical value is 0 when the modulo result flag is decoded as 00B.

The corresponding preset numerical value is 1 when the modulo result flag is decoded as 01B.

The corresponding preset numerical value is 2 when the modulo result flag is decoded as 10B.

The corresponding preset numerical value is 3 when the modulo result flag is decoded as 11B.

In an exemplary embodiment, during encoding the syntax elements of the coefficient, the syntax elements of the coefficient are encoded in any one or more of manners as follows: CAVLC, CABAC, a syntax-based adaptive binary arithmetic coding, PIPE, a bypass encoding mode, or other entropy encoding modes.

In an example, during encoding the syntax elements of the coefficient, the remainder value rem and the sign flag coeff_sign may be encoded in the bypass encoding mode, while the non-zero flag sig, the flag gt1 in which the absolute value of the coefficient is greater than 1, and the modulo result flag rem_flag are encoded in the context-based adaptive encoding mode.

In an example, during encoding the syntax elements of the coefficient, the remainder value rem and the sign flag coeff_sign may be encoded in the bypass encoding mode, while the non-zero flag sig, the flag gt1 in which the absolute value of the coefficient is greater than 1, the flag gt1 in which the absolute value of the coefficient is greater than 1, and the modulo result flag rem_flag are encoded in the context-based adaptive encoding mode.

According to the technical solutions provided in the above embodiments of the disclosure, original coefficient entropy encoding modes are improved, characteristics of adaptive encoding may be utilized better, code rate is effectively saved, and encoding performance is improved.

Figure 28:
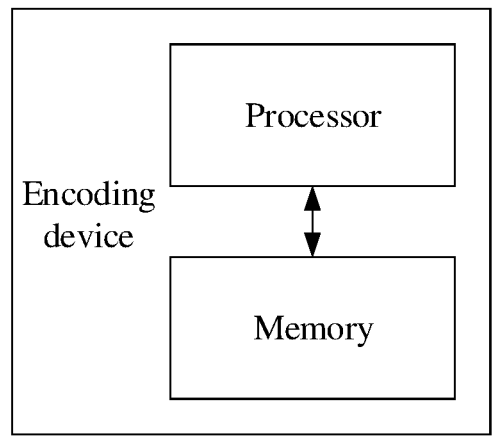
FIG. 28 is a schematic structural diagram of an encoding device according to an embodiment of the disclosure.

An embodiment of the disclosure further provides an encoding device, as shown in FIG. 28, the encoding device includes a processor and a memory storing a computer program executable by the processor. The processor implements the coefficient entropy encoding method described in any one of the above aspects when the processor executes the computer program. The encoding device may be a video encoder or a video codec with any structure.

Figure 29:
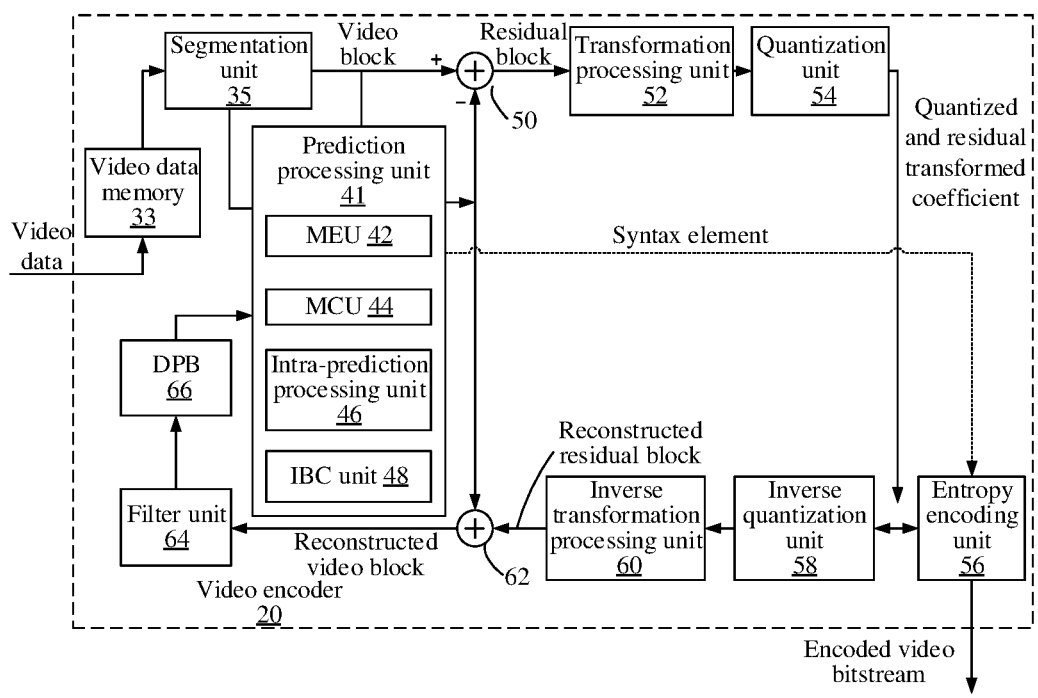
FIG. 29 is a structural block diagram of a video encoder according to an exemplary embodiment of the disclosure.

In an exemplary embodiment, FIG. 29 is a structural block diagram of a video encoder. As shown in FIG. 29, the video encoder 20 includes a video data memory 33, a segmentation unit 35, a prediction processing unit 41, a summer 50, a transformation processing unit 52, a quantization unit 54, and an entropy encoding unit 56. The prediction processing unit 41 includes a motion estimation unit (MEU) 42, a motion compensation unit (MCU) 44, an intra-prediction processing unit 46 and an intra-block copy (IBC) unit 48. It should be understood that the MEU 42, the MCU 44, the intra-prediction processing unit 46 and the IBC unit 48 may be highly integrated actually, although they are individually shown in FIG. 29 to facilitate explanation. In order for reconstruction of a video block, the video encoder 20 further includes an inverse quantization unit 58, an inverse transformation processing unit 60, a summer 62, a filter unit 64, and a decoded picture buffer (DPB) 66.

In an embodiment of the disclosure, the coefficient decoding method described in any one of the above embodiments may be executed by a video decoder.

Figure 30:
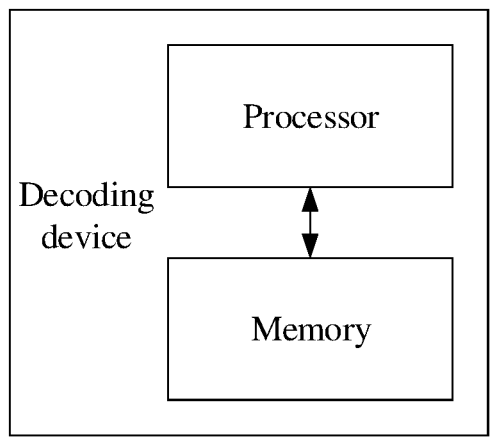
FIG. 30 is a schematic structural diagram of a decoding device according to an embodiment of the disclosure.

An embodiment of the disclosure further provides a decoding device, as shown in FIG. 30, the decoding device includes a processor and a memory storing a computer program executable by the processor, the processor implements the coefficient entropy decoding method described in any one of the above aspects when the processor executes the computer program. The decoding device may be a video decoder or a video codec with any structure.

Figure 31:
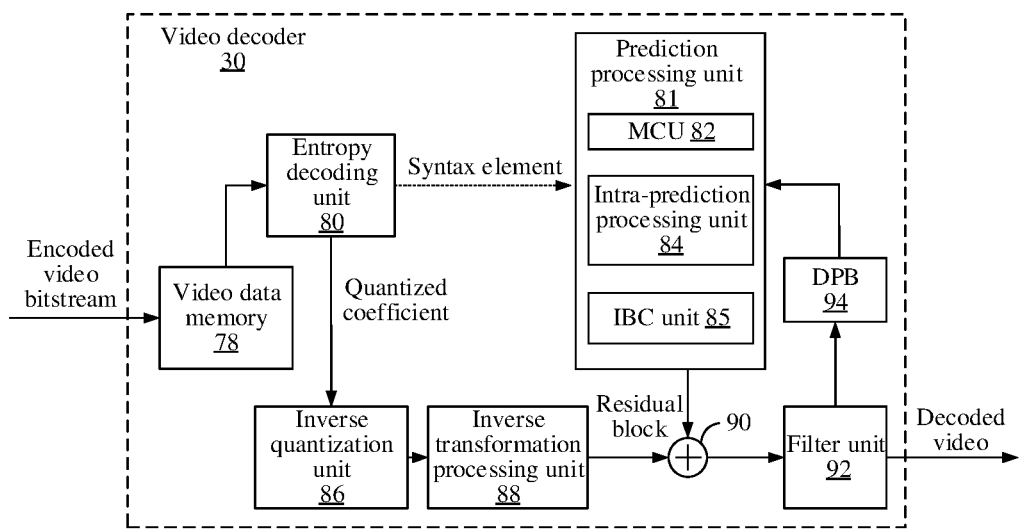
FIG. 31 is a structural block diagram of a video decoder according to an exemplary embodiment of the disclosure.

In an exemplary embodiment, FIG. 31 is a structural block diagram of a video decoder. As shown in FIG. 31, the video decoder 30 includes a video data memory 78, an entropy decoding unit 80, a prediction processing unit 81, an inverse quantization unit 86, an inverse transformation processing unit 88, a summer 90, a filter unit 92, and a DPB 94. The prediction processing unit 81 includes a MCU 82, an intra-prediction processing unit 84 and an IBC unit 85. In some examples, the video decoder 30 may perform a decoding process substantially reversal to the encoding process described with respect to the video encoder 20 from FIG. 30.

An embodiment of the disclosure further provides a non-transitory computer-readable storage medium, having stored thereon a computer program, the computer program implements the coefficient entropy encoding method described in any one of the above aspects, or implements the coefficient entropy decoding method described in any one of the above aspects when the computer program is executed by a processor.

Decoding described in the embodiments of the disclosure may be interpreted as including decoding operations, or interpreted as including encoding operations and decoding operations. Encoding described in the embodiments of the disclosure may be interpreted as including encoding operations, or interpreted as including encoding operations and decoding operations.

The decoded value described in the embodiments of the disclosure may also be referred to as an encoded value, and the encoded value may also be referred to as a decoded value, the two values are the same.

In one or more exemplary embodiments, the described functions may be implemented in hardware, software, firmware, or any combination thereof. When the functions are implemented in software, the functions may be stored on a computer-readable medium as one or more instructions or codes, or transmitted via the computer-readable medium, and executed by a hardware-based processing unit. The computer-readable medium may include a computer-readable storage medium corresponding to a tangible medium such as a data storage medium or the like, or a communication medium including any medium which facilitates transferring a computer program from one place to another place according to a communication protocol for example. In this way, the computer-readable medium may generally correspond to a non-transitory tangible computer-readable storage medium or a communication medium such as a signal or carrier, etc. The data storage medium may be any available medium which may be accessed by one or more computers or one or more processors to retrieve instructions, codes and/or data structures for implementing the technologies described in the disclosure. A computer program product may include the computer-readable medium.

By way of example without limitation, such computer-readable storage medium may include Random Access Memory (RAM), Read Only Memory (ROM), Electrically Erasable Programmable ROM (EEPROM), Compact Disk Read Only Memory (CD-ROM), or other optical disk storage devices, magnetic disk storage devices, or other magnetic storage devices, flash memory, or any other medium which may be used to store desired program codes in form of instructions or data structures and may be accessed by a computer. Furthermore, any connection may also be referred to as a computer-readable medium. For example, when a coaxial cable, an optical fiber cable, a twisted pair line, a digital subscriber line (DSL), or wireless technologies such as infrared, radio, microwave, etc. are used to transmit instructions from a website, server or other remote sources, the coaxial cable, the optical fiber cable, the twisted pair line, the DSL, or the wireless technologies such as infrared, radio, microwave, etc. are included in definition of the medium. However, it should be understood that the computer-readable storage medium and the data storage medium do not include connections, carriers, signals, or other transient (transitory) media, instead, they are directed to non-transient tangible storage media. As used here, the magnetic disk and optical disk includes a compact disk (CD), a laser disk, an optical disk, a digital versatile disk (DVD), a floppy magnetic disk, or a Blue-ray disk, etc. The magnetic disk usually reproduces data magnetically, while the optical disk reproduces data optically by lasers. Combinations of the above items should also be included in the scope of the computer-readable media.

The instructions may be executed by one or more processors such as one or more digital signal processors (DSPs), general-purpose microprocessors, application specific integrated circuits (ASICs), field programmable logic arrays (FPGAs), or other equivalent integrated or discrete logic circuits, etc. Therefore, the term "processor" as used here may refer to any one of the above structures or any other structures suitable to implement the technologies described here. Furthermore, in some aspects, functionality described here may be provided in dedicated hardware and/or software modules configured for encoding and decoding, or incorporated in a combined codec. Furthermore, the technologies may be fully implemented in one or more circuits or logic elements.

The technical solutions of the embodiments of the disclosure may be implemented in a wide variety of apparatuses or devices, including a wireless mobile phone, an integrated circuit (IC), or a group of ICs (e.g., a chipset). Various components, modules or units are described in the embodiments of the disclosure, to emphasize functional aspects of apparatuses configured to perform the described technologies, but are not necessarily implemented by different hardware units. Instead, as described above, various units may be combined in a codec hardware unit, or provided by a set of interoperable hardware units (including one or more processors as described above) in combination with suitable software and/or firmware.

It may be understood by those of ordinary skill in the art that all or some of steps in the methods as disclosed above, functional modules/units in the system and apparatus may be implemented as software, firmware, hardware, and an appropriate combination thereof. In a hardware implementation, division between the functional modules/units mentioned in the above descriptions does not necessarily correspond to division of physical components; for example, one physical component may have multiple functions, or one function or step may be performed by several physical components in a cooperative manner Some or all of the components may be implemented as software executed by a processor such as DSP or microprocessor, or implemented as hardware, or implemented as an IC such as ASIC. Such software may be distributed on a computer-readable medium which may include a computer storage medium (or a non-transitory medium) and a communication medium (or a transitory medium). As well known by those of ordinary skill in the art, the term "computer storage medium" includes volatile and non-volatile, removable and non-removable media implemented in any method or technology for storing information (such as computer-readable instructions, data structures, program modules, or other data). The computer storage medium includes, but is not limited to RAM, ROM, EEPROM, flash memory, or other memory technologies, CD-ROM, DVD, or other optical disk memories, a magnetic cassette, a magnetic tape, a magnetic disk memory, or other magnetic storage devices, or any other medium which may be used to store desired information and may be accessed by a computer. Furthermore, it is well known by those of ordinary skill in the art that the communication medium generally contains computer-readable instructions, data structures, program modules, or other data in modulated data signals such as carriers or other transmission mechanisms, and may include any information delivery medium.

The invention claimed is:

1. A coefficient decoding method, comprising:
   parsing an obtained bitstream, and decoding syntax elements of a to-be-decoded coefficient; and
   determining a value of the to-be-decoded coefficient according to the syntax elements obtained by decoding,
   wherein the syntax elements comprise: a non-zero flag, M flags in which an absolute value is greater than $X_i$, a modulo result flag, a remainder value, and a sign flag;
   an absolute value of the to-be-decoded coefficient is a sum obtained by adding a sum of an encoded value of the non-zero flag, encoded values of the M flags in which the absolute value is greater than $X_i$, and a preset numerical value corresponding to an encoded value of the modulo result flag, to a product of an encoded value of the remainder value and N; the value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, i≥M, i and M are positive integers, N is a positive integer greater than 1, $X_i$ is a positive integer, and when values of i are different, values of $X_i$ are different and incremental with the values of i.

2. The coefficient decoding method of claim 1, further comprising:
   presetting a specific encoded value for a modulo result flag of a specified absolute value;
   decoding the non-zero flag, and in response to that the non-zero flag is decoded as 0, skipping decoding of M flags in which the absolute value of the coefficient is greater than i, the modulo result flag, the remainder value and the sign flag;
   in response to that the non-zero flag is decoded as 1, decoding the M flags in which the absolute value is greater than $X_i$ and skipping, in response to that a g-th flag in which the absolute value is greater than $X_i$ is decoded as 0, decoding of subsequent (M-g) flags in which the absolute value is greater than $X_i$, the modulo result flag and the remainder value, 1≤g≤M;
   decoding the modulo result flag in response to that each of the M flags in which the absolute value of the coefficient is greater than i is 1;
   skipping decoding of the remainder value in response to that the encoded value of the modulo result flag is decoded as the specific encoded value;
   decoding the remainder value in response to that the modulo result flag is not decoded as the specific encoded value; and
   decoding the sign flag in response to that the non-zero flag is decoded as 1.

3. The coefficient decoding method of claim 2, further comprising:
   the absolute value of the coefficient=the decoded value of the non-zero flag+decoded values respectively corresponding to the M flags in which the absolute value is greater than $X_i$+a preset numerical value corresponding to a decoded value of the modulo result flag+the remainder value×N,
   wherein a decoded value of an absent syntax element or a corresponding preset numerical value takes a value of 0 in response to that any one syntax element of the following is absent: the decoded value of the non-zero flag, the decoded values respectively corresponding to the M flags in which the absolute value is greater than $X_i$, the decoded value of the modulo result flag and the remainder value.

4. The coefficient decoding method of claim 2, wherein M=1, $X_1$=1, N=3, the specified absolute value is 2, and the specific encoded value preset for the modulo result flag of the specified absolute value of the coefficient is 11B, or
   M=2, $X_1$=1, $X_2$=2, N=3, the specified absolute value is 3, and the specific encoded value preset for the modulo result flag of the specified absolute value of the coefficient is 00B.

5. The coefficient decoding method of claim 2, wherein M=1, $X_1$=1, and N=3,
   the preset numerical value is 0 when the modulo result flag is decoded as 11B, the preset numerical value is 1 when the modulo result flag is decoded as 00B, the preset numerical value is 2 when the modulo result flag is decoded as 01B, and the preset numerical value is 3 when the modulo result flag is decoded as 10B.

6. The coefficient decoding method of claim 2, wherein M=2, $X_1$=1, $X_2$=2, and N=3, the preset numerical value is 0 when the modulo result flag is decoded as 00B, the preset numerical value is 1 when the modulo result flag is decoded as 01B, the preset numerical value is 2 when the modulo result flag is decoded as 10B, and the preset numerical value is 3 when the modulo result flag is decoded as 11B.

7. The coefficient decoding method of claim 1, further comprising:

decoding the non-zero flag, and in response to that the non-zero flag is decoded as 0, skipping decoding of M flags in which the absolute value of the coefficient is greater than i, the modulo result flag, the remainder value and the sign flag;

in response to that the non-zero flag is decoded as 1, decoding the M flags in which the absolute value is greater than $X_i$, and skipping, in response to that a g-th flag in which the absolute value is greater than $X_i$ is decoded as 0, decoding of subsequent (M-g) flags in which the absolute value is greater than $X_i$, the modulo result flag and the remainder value, wherein 1≤g≤M, and when values of i are different, values of $X_i$ are different and incremental with the values of i;

sequentially decoding the modulo result flag and the remainder value in response to that each of the M flags in which the absolute value is greater than $X_i$ is 1; and decoding the sign flag in response to that the non-zero flag is decoded as 1.

8. The coefficient decoding method of claim 7, wherein M=1, $X_1$=1, and N=4, the preset numerical value is 0 when the modulo result flag is decoded as 00B, the preset numerical value is 1 when the modulo result flag is decoded as 01B, the preset numerical value is 2 when the modulo result flag is decoded as 10B, and the preset numerical value is 3 when the modulo result flag is decoded as 11B.

9. The coefficient decoding method of claim 1, wherein M=1, 2 or 3, and N=2, 3, 4 or 5.

10. A coefficient encoding method, comprising:

generating a coefficient block based on a residual block, scanning coefficients in the coefficient block, and encoding syntax elements of a to-be-encoded coefficient; and writing codewords generated by encoding into a bitstream, wherein the syntax elements comprise: a non-zero flag, M flags in which an absolute value is greater than $X_i$, a modulo result flag, a remainder value, and a sign flag; an absolute value of a to-be-decoded coefficient is a sum obtained by adding a sum of an encoded value of the non-zero flag, encoded values of the M flags in which the absolute value is greater than $X_i$, and a preset numerical value corresponding to an encoded value of the modulo result flag, to a product of an encoded value of the remainder value and N; a value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, i≥M, i and M are positive integers, N is a positive integer greater than 1, $X_i$ is a positive integer, and when values of i are different, values of $X_i$ are different and incremental with the values of i.

11. The coefficient encoding method of claim 10, wherein encoding of the modulo result flag is binary encoding and occupies K flag bits, and the binary encoding of the modulo result flag comprises $2^K$ types of binary encoding, the method further comprises: presetting a specific encoded value for the modulo result flag of a specified absolute value of the coefficient; encoding the non-zero flag: encoding the non-zero flag as 0 and skipping encoding of M flags in which the absolute value of the coefficient is greater than i, the modulo result flag, the remainder value and the sign flag in response to that the absolute value of the coefficient is 0, and encoding the non-zero flag as 1 in response to that the absolute value of the coefficient is not 0;

in response to that the non-zero flag is encoded as 1, sequentially encoding the M flags in which the absolute value is greater than $X_i$, in response to that the absolute value of the coefficient is Q, encoding a flag in which $X_i$ is greater than Q and the absolute value is greater than $X_i$ as 0 and skipping encoding of subsequent flags in which the absolute value is greater than $X_i$, and encoding a flag in which $X_i$ is less than or equal to Q and the absolute value is greater than $X_i$ as 1;

skipping encoding of the modulo result flag and the remainder value in response to that any one of the M flags in which the absolute value is greater than $X_i$ is encoded as 0; in response to that each of the M flags in which the absolute value is greater than $X_i$ is encoded as 1, encoding the modulo result flag: encoding the modulo result flag as the specific encoded value in response to that the absolute value of the coefficient is the specified absolute value of the coefficient, wherein the specific encoded value has a global uniqueness; and in response to that the absolute value of the coefficient is not the specified absolute value of the coefficient, encoding ($2^K$-N) types of binary encoding as modulo result flags of coefficients having absolute values of M+1 to M+$2^K$-N, and defining encoded values of the ($2^K$-N) types of binary encoding as 0 to $2^K$-N-1 respectively; encoding remaining N types of binary encoding as modulo result flags of coefficients having absolute values greater than M+$2^K$-N respectively, and defining encoded values of the N types of binary encoding as 1 to N respectively;

in response to that the absolute value of the coefficient is not the specified absolute value of the coefficient, encoding the remainder value, and encoding the remainder value as a quotient value, the quotient value being obtained by subtracting the encoded value corresponding to the non-zero flag, encoded values respectively corresponding to the M flags in which the absolute value of the coefficient is greater than i, and the preset numerical value corresponding to the encoded value of the modulo result flag from the absolute value of the coefficient and then dividing by N, wherein the preset numerical value corresponding to the encoded value of the modulo result flag satisfies that the calculated quotient value is an integer; and in response to that the non-zero flag is encoded as 1, encoding the sign flag: encoding the sign flag as 0 in response to that the coefficient is positive, and encoding the sign flag as 1 in response to that the coefficient is negative.

12. The coefficient encoding method of claim 11, wherein $M=1$, $X_1=1$, $N=3$, $K=2$, the specified absolute value of the coefficient is 2, and the specific encoded value preset for the modulo result flag of the specified absolute value is 11B; the modulo result flag of a coefficient in which a remainder of 0 is obtained by an absolute value of the coefficient divided by 3 is encoded as 00B, the modulo result flag of a coefficient in which a remainder of 1 is obtained by an absolute value of the coefficient divided by 3 is encoded as 01B, and the modulo result flag of a coefficient in which a remainder of 2 is obtained by an absolute value of the coefficient divided by 3 is encoded as 10B, the preset numerical value is 0 when the modulo result flag is encoded as 11B, the preset numerical value is 1 when the modulo result flag is encoded as 00B, the preset numerical value is 2 when the modulo result flag is encoded as 01B, and the preset numerical value is 3 when the modulo result flag is encoded as 10B.

13. The coefficient encoding method of claim 11, wherein $M=2$, $X_1=1$, $X_2=2$, $N=3$, $K=2$, the specified absolute value of the coefficient is 3, and the specific encoded value preset for the modulo result flag of the specified absolute value of the coefficient is 00B; the modulo result flag of a coefficient in which a remainder of 0 is obtained by an absolute value of the coefficient divided by 3 is encoded as 11B, the modulo result flag of a coefficient in which a remainder of 1 is obtained by an absolute value of the coefficient divided by 3 is encoded as 01B, and the modulo result flag of a coefficient in which a remainder of 2 is obtained by an absolute value of the coefficient divided by 3 is encoded as 10B, the preset numerical value is 0 when the modulo result flag is decoded as 00B, the preset numerical value is 1 when the modulo result flag is decoded as 01B, the preset numerical value is 2 when the modulo result flag is decoded as 10B, and the preset numerical value is 3 when the modulo result flag is decoded as 11B.

14. The coefficient encoding method of claim 10, wherein encoding of the modulo result flag is binary encoding and occupies K flag bits, and the binary encoding of the modulo result flag comprises $2^K$ types of binary encoding, the method further comprises:

encoding the non-zero flag: encoding the non-zero flag as 0 and skipping encoding of M flags in which the absolute value of the coefficient is greater than i, the modulo result flag, the remainder value and the sign flag in response to that the absolute value of the coefficient is 0; and encoding the non-zero flag as 1 in response to that the absolute value of the coefficient is not 0;

in response to that the non-zero flag is encoded as 1, sequentially encoding the M flags in which the absolute value is greater than $X_i$, in response to that the absolute value of the coefficient is Q, encoding a flag in which $X_i$ is greater than Q and the absolute value is greater than $X_i$ as 0 and skipping encoding of subsequent flags in which the absolute value is greater than $X_i$, and encoding a flag in which $X_i$ is less than or equal to Q and the absolute value is greater than $X_i$ as 1;

skipping encoding of the modulo result flag and the remainder value in response to that any one of the M flags in which the absolute value is greater than $X_i$ is encoded as 0; in response to that each of the M flags in which the absolute value is greater than $X_i$ is encoded as 1, encoding the modulo result flag: encoding $(2^K-N)$ types of binary encoding as modulo result flags of coefficients having absolute values of $M+1$ to $M+2^K-N$, and defining encoded values of the $(2^K-N)$ types of binary encoding as 0 to $2^K-N-1$ respectively; encoding remaining N types of binary encoding as modulo result flags of coefficients having absolute values greater than $M+2^K-N$ respectively, and defining encoded values of the N types of binary encoding as 1 to N respectively;

in response to that each of the M flags in which the absolute value is greater than $X_i$ is encoded as 1, encoding the remainder value, and encoding the remainder value as a quotient value, the quotient value being obtained by subtracting the encoded value corresponding to the non-zero flag, encoded values respectively corresponding to the M flags in which the absolute value of the coefficient is greater than i, and the preset numerical value corresponding to the encoded value of the modulo result flag from the absolute value of the coefficient and then dividing by N, wherein the preset numerical value corresponding to the encoded value of the modulo result flag satisfies that the calculated quotient value is an integer; and in response to that the non-zero flag is encoded as 1, encoding the sign flag: encoding the sign flag as 0 in response to that the coefficient is positive, and encoding the sign flag as 1 in response to that the coefficient is negative.

15. The coefficient encoding method of claim 14, wherein $M=1$, $X_1=1$, $N=4$, $K=2$, the modulo result flag of a coefficient in which a remainder of 0 is obtained by an absolute value of the coefficient divided by 4 is encoded as 10B, the modulo result flag of a coefficient in which a remainder of 1 is obtained by an absolute value of the coefficient divided by 4 is encoded as 11B, the modulo result flag of a coefficient in which a remainder of 2 is obtained by an absolute value of the coefficient divided by 4 is encoded as 00B, and the modulo result flag of a coefficient in which a remainder of 3 is obtained by an absolute value of the coefficient divided by 4 is encoded as 01B, the preset numerical value is 0 when the modulo result flag is decoded as 00B, the preset numerical value is 1 when the modulo result flag is decoded as 01B, the preset numerical value is 2 when the modulo result flag is decoded as 10B, and the preset numerical value is 3 when the modulo result flag is decoded as 11B.

16. The coefficient encoding method of claim 10, wherein $M=1$, 2 or 3, and $N=2$, 3, 4 or 5.

17. An encoding device, comprising: a processor; and a memory storing a computer program executable by the processor, wherein the processor implements the coefficient encoding method of claim 10.

18. A decoding device, comprising: a processor; and a memory storing a computer program executable by the processor, wherein the processor is configured to:

parse an obtained bitstream, and decode syntax elements of a to-be-decoded coefficient; and determine a value of the to-be-decoded coefficient according to the syntax elements obtained by decoding, wherein the syntax elements comprise: a non-zero flag, M flags in which an absolute value is greater than $X_i$, a modulo result flag, a remainder value, and a sign flag; an absolute value of the to-be-decoded coefficient is a sum obtained by adding a sum of an encoded value of the non-zero flag, encoded values of the M flags in which the absolute value is greater than $X_i$, and a preset numerical value corresponding to an encoded value of the modulo result flag, to a product of an encoded value of the remainder value and N; the value of the to-be-decoded coefficient is a value determined according to the absolute value of the to-be-decoded coefficient and the sign flag indicating a positive or negative characteristic; the encoded value of the modulo result flag is determined according to a modulo operation of the coefficient on N, i≥M, i and M are positive integers, N is a positive integer greater than 1, $X_i$ is a positive integer, and when values of i are different, values of $X_i$ are different and incremental with the values of i.

19. The coefficient decoding device of claim 18, wherein the processor is further configured to:

preset a specific encoded value for a modulo result flag of a specified absolute value;

decode the non-zero flag, and in response to that the non-zero flag is decoded as 0, skip decoding of M flags in which the absolute value of the coefficient is greater than i, the modulo result flag, the remainder value and the sign flag;

in response to that the non-zero flag is decoded as 1, decode the M flags in which the absolute value is greater than $X_i$ and skip, in response to that a g-th flag in which the absolute value is greater than $X_i$ is decoded as 0, decoding of subsequent (M-g) flags in which the absolute value is greater than $X_i$, the modulo result flag and the remainder value, 1≤g≤M;

decode the modulo result flag in response to that each of the M flags in which the absolute value of the coefficient is greater than i is 1;

skip decoding of the remainder value in response to that the encoded value of the modulo result flag is decoded as the specific encoded value;

decode the remainder value in response to that the modulo result flag is not decoded as the specific encoded value; and decode the sign flag in response to that the non-zero flag is decoded as 1.

20. The coefficient decoding device of claim 18, wherein the processor is further configured to:

decode the non-zero flag, and in response to that the non-zero flag is decoded as 0, skip decoding of M flags in which the absolute value of the coefficient is greater than i, the modulo result flag, the remainder value and the sign flag;

in response to that the non-zero flag is decoded as 1, decode the M flags in which the absolute value is greater than $X_i$, and skip, in response to that a g-th flag in which the absolute value is greater than $X_i$ is decoded as 0, decoding of subsequent (M-g) flags in which the absolute value is greater than $X_i$, the modulo result flag and the remainder value, wherein 1≤g≤M, and when values of i are different, values of $X_i$ are different and incremental with the values of i;

sequentially decode the modulo result flag and the remainder value in response to that each of the M flags in which the absolute value is greater than $X_i$ is 1; and decode the sign flag in response to that the non-zero flag is decoded as 1.

* * * * *